United States Patent
Reznik et al.

(10) Patent No.: US 7,042,967 B2
(45) Date of Patent: May 9, 2006

(54) REDUCED COMPLEXITY SLIDING WINDOW BASED EQUALIZER

(75) Inventors: Alexander Reznik, Titusville, NJ (US); Rui Yang, Greenlawn, NY (US); Bin Li, Ronkonkoma, NY (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 76 days.

(21) Appl. No.: 10/875,900

(22) Filed: Jun. 24, 2004

(65) Prior Publication Data

US 2005/0025267 A1 Feb. 3, 2005

Related U.S. Application Data

(63) Continuation-in-part of application No. 10/791,244, filed on Mar. 2, 2004.

(60) Provisional application No. 60/482,333, filed on Jun. 25, 2003, provisional application No. 60/452,165, filed on Mar. 3, 2003.

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)

(52) U.S. Cl. ............ 375/346; 375/353; 375/231; 375/238; 375/239; 375/256; 375/257; 375/285; 375/286; 327/310; 327/384; 327/551; 348/607; 455/296

(58) Field of Classification Search ............ 375/346, 375/231, 238, 239, 256, 257, 285, 286, 353; 327/310, 384, 551; 348/607; 455/296

See application file for complete search history.

(56) References Cited

U.S. PATENT DOCUMENTS

| | | |
|---|---|---|
| 5,412,620 A | 5/1995 | Cafarella et al. |
| 5,487,069 A | 1/1996 | O'Sullivan et al. |
| 5,559,757 A | 9/1996 | Catipovic et al. |
| 5,577,066 A | 11/1996 | Schuchman et al. |
| 5,612,978 A | 3/1997 | Blanchard et al. |
| 5,796,814 A | 8/1998 | Brajal et al. |
| 5,805,638 A | 9/1998 | Liew |
| 5,818,868 A | 10/1998 | Gaudenzi et al. |
| 5,828,658 A | 10/1998 | Ottersten et al. |

(Continued)

FOREIGN PATENT DOCUMENTS

EP 0 766 468 A2 4/1997

(Continued)

OTHER PUBLICATIONS

"Fast Algorithm for Solving Toeplitz Systems of Equations", IBM Technical Disclosure Bulletin, May 1980, US, vol. 22 No. 12.

(Continued)

*Primary Examiner*—Stephen Chin
*Assistant Examiner*—Erin M. File
(74) *Attorney, Agent, or Firm*—Volpe and Koenig, P.C.

(57) ABSTRACT

The present invention has many aspects. One aspect of the invention is to perform equalization using a sliding window approach. A second aspect reuses information derived for each window for use by a subsequent window. A third aspect utilizes a discrete Fourier transform based approach for the equalization. A fourth aspect relates to handling oversampling of the received signals and channel responses. A fifth aspect relates to handling multiple reception antennas. A sixth embodiment relates to handling both oversampling and multiple reception antennas.

70 Claims, 8 Drawing Sheets

U.S. PATENT DOCUMENTS

| | | |
|---|---|---|
| 5,930,369 A | 7/1999 | Cox et al. |
| 6,047,020 A | 4/2000 | Hottinen |
| 6,097,753 A | 8/2000 | Ko |
| 6,128,276 A | 10/2000 | Agee |
| 6,137,843 A | 10/2000 | Chennakeshu et al. |
| 6,141,393 A | 10/2000 | Thomas et al. |
| 6,144,711 A | 11/2000 | Raleigh et al. |
| 6,181,714 B1 | 1/2001 | Isaksson et al. |
| 6,188,717 B1 | 2/2001 | Kaiser et al. |
| 6,219,561 B1 | 4/2001 | Raleigh |
| 6,289,005 B1 | 9/2001 | Katz |
| 6,320,903 B1 | 11/2001 | Isaksson et al. |
| 6,321,066 B1 | 11/2001 | Katz et al. |
| 6,321,082 B1 | 11/2001 | Katz |
| 6,359,926 B1 | 3/2002 | Isaksson et al. |
| 6,359,938 B1 | 3/2002 | Keevill et al. |
| 6,363,128 B1 | 3/2002 | Isaksson et al. |
| 6,366,554 B1 | 4/2002 | Isaksson et al. |
| 6,377,632 B1 | 4/2002 | Paulraj et al. |
| 6,392,595 B1 | 5/2002 | Katz et al. |
| 6,396,801 B1 | 5/2002 | Upton et al. |
| 6,438,174 B1 | 8/2002 | Isaksson et al. |
| 6,445,342 B1 | 9/2002 | Thomas et al. |
| 6,456,649 B1 | 9/2002 | Isaksson et al. |
| 6,466,629 B1 | 10/2002 | Isaksson et al. |
| 6,473,449 B1 | 10/2002 | Cafarella et al. |
| 6,473,453 B1 | 10/2002 | Wilkinson |
| 6,493,395 B1 | 12/2002 | Isaksson et al. |
| 6,505,053 B1 | 1/2003 | Winters et al. |
| 6,512,737 B1 | 1/2003 | Agee |
| 6,538,986 B1 | 3/2003 | Isaksson et al. |
| 6,553,012 B1 | 4/2003 | Katz |
| 6,611,855 B1 | 8/2003 | Hellberg et al. |
| 6,618,431 B1 | 9/2003 | Lee |
| 6,643,526 B1 | 11/2003 | Katz |
| 6,658,619 B1 | 12/2003 | Chen |
| 6,662,024 B1 | 12/2003 | Walton et al. |
| 6,671,334 B1 | 12/2003 | Kuntz et al. |
| 6,674,795 B1 | 1/2004 | Liu et al. |
| 6,680,969 B1 | 1/2004 | Molnar et al. |
| 6,684,065 B1 | 1/2004 | Bult et al. |
| 6,693,953 B1 | 2/2004 | Cox et al. |
| 6,700,919 B1 | 3/2004 | Papasakellariou |
| 6,724,743 B1 | 4/2004 | Pigeonnat |
| 6,729,929 B1 | 5/2004 | Sayers et al. |
| 6,744,320 B1 | 6/2004 | Nguyen et al. |
| 6,745,352 B1 | 6/2004 | Cheng |
| 6,757,321 B1 | 6/2004 | Pan et al. |
| 6,760,388 B1 | 7/2004 | Ketchum et al. |
| 2001/0033614 A1 | 10/2001 | Hudson |
| 2001/0049295 A1 | 12/2001 | Matsuoka et al. |
| 2001/0055319 A1 | 12/2001 | Quigley et al. |
| 2002/0034191 A1 | 3/2002 | Shattil |
| 2002/0097784 A1 | 7/2002 | Brunel |
| 2002/0118765 A1 | 8/2002 | Nangia et al. |
| 2002/0119803 A1 | 8/2002 | Bitterlich et al. |
| 2002/0122406 A1 | 9/2002 | Chillariga et al. |
| 2002/0122465 A1 | 9/2002 | Agee et al. |
| 2002/0126741 A1 | 9/2002 | Baum et al. |
| 2002/0126768 A1 | 9/2002 | Isaksson et al. |
| 2002/0159415 A1 | 10/2002 | Pan et al. |
| 2002/0159506 A1 | 10/2002 | Alamouti et al. |
| 2002/0159537 A1 | 10/2002 | Crilly, Jr. |
| 2002/0186715 A1 | 12/2002 | Mestdagh |
| 2003/0003880 A1 | 1/2003 | Ling et al. |
| 2003/0004697 A1 | 1/2003 | Ferris |
| 2003/0008684 A1 | 1/2003 | Ferris |
| 2003/0021237 A1 | 1/2003 | Min et al. |
| 2003/0021365 A1 | 1/2003 | Min et al. |
| 2003/0022651 A1 | 1/2003 | Bannasch et al. |
| 2003/0022680 A1 | 1/2003 | Shreve |
| 2003/0026201 A1 | 2/2003 | Arnesen |
| 2003/0035392 A1 | 2/2003 | Pan et al. |
| 2003/0035491 A1 | 2/2003 | Walton et al. |
| 2003/0043732 A1 | 3/2003 | Walton et al. |
| 2003/0043767 A1 | 3/2003 | Pan et al. |
| 2003/0043887 A1 | 3/2003 | Hudson |
| 2003/0043925 A1 | 3/2003 | Stopler et al. |
| 2003/0048856 A1 | 3/2003 | Ketchum et al. |
| 2003/0058952 A1 | 3/2003 | Webster et al. |
| 2003/0063557 A1 | 4/2003 | Mottier |
| 2003/0072291 A1 | 4/2003 | Brunel |
| 2003/0076900 A1 | 4/2003 | Magee et al. |
| 2003/0076908 A1 | 4/2003 | Huang et al. |
| 2003/0081781 A1 | 5/2003 | Jensen et al. |
| 2003/0086366 A1 | 5/2003 | Branlund et al. |
| 2003/0099216 A1 | 5/2003 | Nilsson et al. |
| 2003/0103584 A1 | 6/2003 | Bjerke et al. |
| 2003/0108117 A1 | 6/2003 | Ketchum et al. |
| 2003/0112880 A1 | 6/2003 | Walton et al. |
| 2003/0123384 A1 | 7/2003 | Agee |
| 2003/0125040 A1 | 7/2003 | Walton et al. |
| 2003/0128658 A1 | 7/2003 | Walton et al. |
| 2003/0129984 A1 | 7/2003 | Dent |
| 2003/0133403 A1 | 7/2003 | Castelain et al. |
| 2003/0147655 A1 | 8/2003 | Shattil |
| 2003/0152025 A1 | 8/2003 | Andersson et al. |
| 2003/0165131 A1 | 9/2003 | Liang et al. |
| 2003/0185310 A1 | 10/2003 | Ketchum et al. |
| 2003/0215007 A1 | 11/2003 | Mottier |
| 2003/0216154 A1 | 11/2003 | Mennenga et al. |
| 2003/0227866 A1 | 12/2003 | Yamaguchi |
| 2003/0235255 A1 | 12/2003 | Ketchum et al. |
| 2004/0032354 A1 | 2/2004 | Knobel et al. |
| 2004/0032918 A1 | 2/2004 | Shor et al. |
| 2004/0052236 A1 | 3/2004 | Hwang et al. |
| 2004/0086027 A1 | 5/2004 | Shattil |
| 2004/0086035 A1 | 5/2004 | Upton et al. |
| 2004/0087275 A1 | 5/2004 | Sugar et al. |
| 2004/0095907 A1 | 5/2004 | Agee et al. |
| 2004/0100897 A1 | 5/2004 | Shattil |
| 2004/0101046 A1 | 5/2004 | Yang et al. |
| 2004/0116077 A1 | 6/2004 | Lee et al. |
| 2004/0120274 A1 | 6/2004 | Petre et al. |
| 2004/0120424 A1 | 6/2004 | Roberts |
| 2004/0136399 A1 | 7/2004 | Roberts |
| 2004/0141548 A1 | 7/2004 | Shattil |
| 2004/0142663 A1 | 7/2004 | Roberts |
| 2004/0146024 A1 | 7/2004 | Li et al. |

FOREIGN PATENT DOCUMENTS

| | | |
|---|---|---|
| EP | 1 017 183 A2 | 7/2000 |
| EP | 1 047 209 A1 | 10/2000 |
| EP | 1 063 780 A2 | 12/2000 |
| EP | 1 119 146 A2 | 7/2001 |
| EP | 1 139 632 A1 | 10/2001 |
| EP | 1 175 022 A2 | 1/2002 |
| EP | 1 255 387 A1 | 11/2002 |
| EP | 1 289 182 A2 | 3/2003 |
| EP | 1 300 999 A1 | 4/2003 |
| EP | 1 303 094 A2 | 4/2003 |
| EP | 1 357 693 A1 | 10/2003 |
| EP | 1 365 554 A1 | 11/2003 |
| EP | 1 379 020 A1 | 1/2004 |
| EP | 1 411 693 A3 | 4/2004 |
| WO | 95/22859 | 8/1995 |
| WO | 95/27349 | 10/1995 |
| WO | 96/22638 | 7/1996 |
| WO | 97/34421 | 9/1997 |
| WO | 97/35384 | 9/1997 |
| WO | 97/48192 | 12/1997 |
| WO | 98/09395 | 3/1998 |
| WO | 98/10545 | 3/1998 |

| | | |
|---|---|---|
| WO | 98/10549 | 3/1998 |
| WO | 98/10550 | 3/1998 |
| WO | 98/10552 | 3/1998 |
| WO | 98/10553 | 3/1998 |
| WO | 98/10554 | 3/1998 |
| WO | 98/10555 | 3/1998 |
| WO | 98/18272 | 4/1998 |
| WO | 98/36596 | 8/1998 |
| WO | 98/36598 | 8/1998 |
| WO | 98/36599 | 8/1998 |
| WO | 98/37638 | 8/1998 |
| WO | 99/49602 | 9/1999 |
| WO | 99/62280 | 12/1999 |
| WO | 00/11823 | 3/2000 |
| WO | 00/52872 | 9/2000 |
| WO | 01/10085 A1 | 2/2001 |
| WO | 01/33761 A1 | 5/2001 |
| WO | 01/33791 A1 | 5/2001 |
| WO | 01/47202 A2 | 6/2001 |
| WO | 01/47203 A2 | 6/2001 |
| WO | 01/53932 A2 | 7/2001 |
| WO | 01/54300 A2 | 7/2001 |
| WO | 01/54305 A1 | 7/2001 |
| WO | 02/054537 A1 | 7/2001 |
| WO | 02/29977 A2 | 4/2002 |
| WO | 02/054601 A1 | 7/2002 |
| WO | 02/061962 A1 | 8/2002 |
| WO | 02/067527 A2 | 8/2002 |
| WO | 02/073937 A2 | 9/2002 |
| WO | 02/080483 A1 | 10/2002 |
| WO | 02/082683 A2 | 10/2002 |
| WO | WO/082683 A2 | 10/2002 |
| WO | 02/093779 A2 | 11/2002 |
| WO | 02/093784 A1 | 11/2002 |
| WO | 02/093819 A1 | 11/2002 |
| WO | 03/005291 A1 | 1/2003 |
| WO | 03/010898 A1 | 2/2003 |
| WO | 03/015292 A2 | 2/2003 |
| WO | 03/026237 A2 | 3/2003 |
| WO | 03/028270 A1 | 4/2003 |
| WO | 03/044983 A2 | 5/2003 |
| WO | 03/081823 A1 | 10/2003 |
| WO | 03/084092 A2 | 10/2003 |
| WO | 03/092212 A1 | 11/2003 |
| WO | 2004/002047 A1 | 12/2003 |
| WO | 2004/003743 A1 | 1/2004 |
| WO | 2004/008704 A1 | 1/2004 |
| WO | 2004/023704 A2 | 3/2004 |
| WO | 2004/032347 A1 | 4/2004 |
| WO | 2004/036345 A2 | 4/2004 |
| WO | 2004/038984 A2 | 5/2004 |
| WO | 2004/059935 A1 | 7/2004 |
| WO | 2004/064298 A2 | 7/2004 |

OTHER PUBLICATIONS

"Fast Algorithm for Solving Toeplitz Systems of Equations"_IBM Technical Disclosure Bulletin, May 1980, US, vol. 22. No. 12.

Vollmer et al., "Comparative Study of Joint-Detection Techniques for TD-CDMA Based Mobile Radio Systems", IEEE Journal on Selected Areas in Communications, vol. 19, No. 8, Aug. 2001, pp. 1461-1475.

Haykin, "Adaptive Filter Theory", Third Edition, Prentice Hall, 1996, pp. 87-93.

REDUCED COMPLEXITY SLIDING WINDOW BASED EQUALIZER

CROSS REFERENCE TO RELATED APPLICATION(S)

This application claims priority from U.S. provisional application No. 60/482,333, filed on Jun. 25, 2003 and is a continuation-in-part of U.S. patent application Ser. No. 10/791,244, filed Mar. 2, 2004, which claims priority from 60/452,165, filed on Mar. 3, 2003, which is incorporated by reference as if fully set forth.

FIELD OF INVENTION

The invention generally relates to wireless communication systems, In particular, the invention relates to data detection in such systems.

BACKGROUND

Due to the increased demands for improved receiver performance, many advanced receivers use zero forcing (ZF) block linear equalizers and minimum mean square error (MMSE) equalizers.

In both these approaches, the received signal is typically modeled per Equation 1.

$$r = Hd + n \qquad \text{Equation 1}$$

r is the received vector, comprising samples of the received signal. H is the channel response matrix. d is the data vector to be estimated. In spread spectrum systems, such as code division multiple access (CDMA) systems, d may be represented as data symbols or a composite spread data vector. For a composite spread data vector, the data symbols for each individual code are produced by despreading the estimated data vector d with that code. n is the noise vector.

In a ZF block linear equalizer, the data vector is estimated, such as per Equation 2.

$$d = (H^H H)^{-1} H^H r \qquad \text{Equation 2}$$

$(\cdot)^H$ is the complex conjugate transpose (or Hermetian) operation. In a MMSE block linear equalizer, the data vector is estimated, such as per Equation 3.

$$d = (H^H H + \sigma^2 I)^{-1} H^H r \qquad \text{Equation 3}$$

In wireless channels experiencing multipath propagation, to accurately detect the data using these approaches requires that an infinite number of received samples be used, which is not practical. Therefore, it is desirable to use an approximation technique. One of the approaches is a sliding window approach. In the sliding window approach, a predetermined window of received samples and channel responses are used in the data detection. After the initial detection, the window is slid down to a next window of samples. This process continues until the communication ceases.

By not using an infinite number of samples, an error is introduced into the symbol model shown in Equation 1 and, therefore causes inaccurate data detection. The error is most prominent at the beginning and end of the window, where the effectively truncated portions of the infinite sequence have the largest impact. One approach to reduce these errors is to use a large window size and truncate the results at the beginning and the end of the window. The truncated portions of the window are determined in previous and subsequent windows. This approach has considerable complexity, especially when the channel delay spread is large. The large window size leads to large dimensions on the matrices and vectors used in the data estimation. Additionally, this approach is not computationally efficient by detection data at the beginning and at the ends of the window and then discarding that data.

Accordingly, it is desirable to have alternate approaches to data detection.

SUMMARY

The present invention has many aspects. One aspect of the invention is to perform equalization using a sliding window approach. A second aspect reuses information derived for each window for use by a subsequent window. A third aspect utilizes a discrete Fourier transform based approach for the equalization. A fourth aspect relates to handling oversampling of the received signals and channel responses. A fifth aspect relates to handling multiple reception antennas. A sixth aspect relates to handling both oversampling and multiple reception antennas.

BRIEF DESCRIPTION OF THE DRAWING(S)

DETAILED DESCRIPTION OF THE PREFERRED EMBODIMENT(S)

Figure 1:
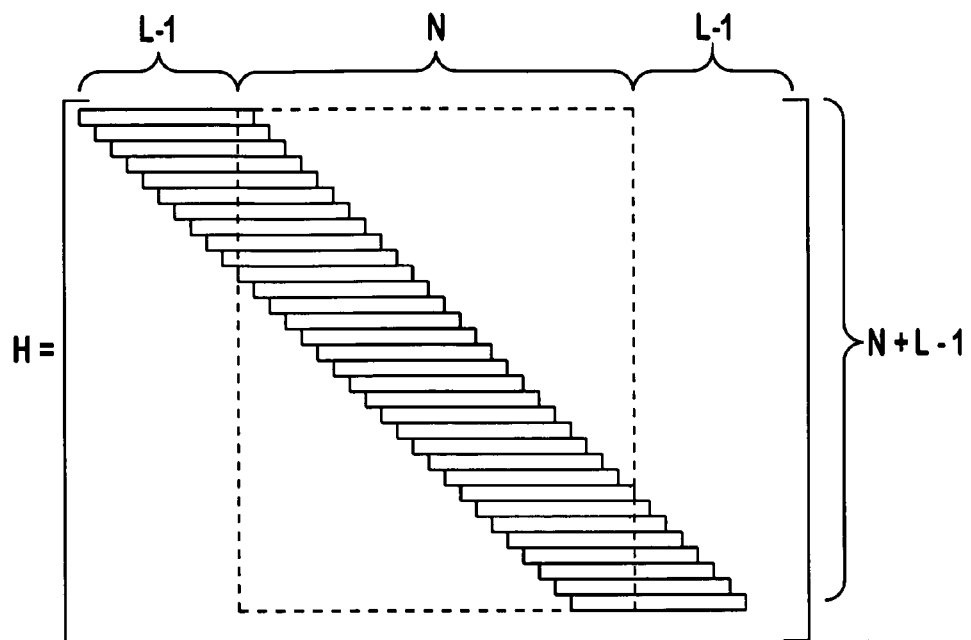
FIG. 1 is an illustration of a banded channel response matrix.

Although the features and elements of the present invention are described in the preferred embodiments in particular combinations, each feature or element can be used alone (without the other features and elements of the preferred embodiments) or in various combinations with or without other features and elements of the present invention.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

Although reduced complexity sliding window equalizer is described in conjunction with a preferred wireless code division multiple access communication system, such as CDMA2000 and universal mobile terrestrial system (UMTS) frequency division duplex (FDD), time division duplex (TDD) modes and time division synchronous CDMA (TD-SCDMA), it can be applied to various communication system and, in particular, various wireless communication systems. In a wireless communication system, it can be applied to transmissions received by a WTRU from a base station, received by a base station from one or multiple WTRUs or received by one WTRU from another WTRU, such as in an ad hoc mode of operation.

The following describes the implementation of a reduced complexity sliding window based equalizer using a preferred MMSE algorithm. However, other algorithms can be used, such as a zero forcing algorithm. $h(\cdot)$ is the impulse response of a channel. $d(k)$ is the $k^{th}$ transmitted sample that $$r(j) = \sum_{k=0}^{L-1} h(k)d(j-k) + n(j) \quad \text{Equation 6}$$
$$j \in \{\ldots -2, -1, 0, 1, 2, \ldots\}$$

Considering that the received signal has M received signals $r(0), \ldots, r(M-1)$, Equation 7 results.

$$r = Hd + n \quad \text{Equation 7}$$

where, $$\bar{r} = [r(0), \ldots, r(M-1)]^T \in C^M,$$
$$\bar{d} = [d(-L+1), d(-L+2), \ldots, d(0), d(1), \ldots, d(M-1)]^T \in C^{M+L-1}$$
$$\bar{n} = [n(0), \ldots, n(M-1)]^T \in C^M$$

$$H = \begin{bmatrix} h(L-1) & h(L-2) & \ldots & h(1) & h(0) & 0 & \ldots & \ldots \\ 0 & h(L-1) & h(L-2) & \ldots & h(1) & h(0) & 0 & \ldots \\ \vdots & \ddots & \ddots & \ddots & \ddots & \ddots & \ddots & \vdots \\ \ldots & \ldots & 0 & h(L-1) & h(L-2) & \ldots & h(1) & h(0) \end{bmatrix} \in C^{M \times (M+L-1)}$$

is generated by spreading a symbol using a spreading code. It can also be sum of the chips that are generated by spreading a set of symbols using a set of codes, such as orthogonal codes. $r(\cdot)$ is the received signal. The model of the system can expressed as per Equation 4.

In Equation 7, $C^M$ represents the space of all complex vectors with dimension M.

Part of the vector d can be determined using an approximate equation. Assuming M>L and defining N=M−L+1, vector d is per Equation 8.

$$\bar{d} = [\underbrace{d(-L+1), d(-L+2), \ldots, d(-1)}_{L-1}, \underbrace{d(0), d(1), \ldots, d(N-1)}_{N}, \underbrace{d(N), \ldots, d(N+L-2)}_{L-1}]^T \in C^{N+2L-2} \quad \text{Equation 8}$$

$$r(t) = \sum_{k=-\infty}^{\infty} d(k)h(t-kT_c) + n(t) \quad -\infty < t < \infty \quad \text{Equation 4}$$

n(t) is the sum of additive noise and interference (intracell and inter-cell). For simplicity, the following is described assuming chip rate sampling is used at the receiver, although other sampling rates may be used, such as a multiple of the chip rate. The sampled received signal can be expressed as per Equation 5.

$$r(j) = \sum_{k=-\infty}^{\infty} d(k)h(j-k) + n(j) \quad \text{Equation 5}$$
$$= \sum_{k=-\infty}^{\infty} d(j-k)h(k) + n(j)$$
$$j \in \{\ldots, -2, -1, 0, 1, 2, \ldots\}$$

$T_c$ is being dropped for simplicity in the notations.

Assuming $h(\cdot)$ has a finite support and is time invariant. This means that in the discrete-time domain, index L exists such that $h(i)=0$ for $i<0$ and $i \geq L$. As a result, Equation 5 can be re-written as Equation 6.

The H matrix in Equation 7 is a banded matrix, which can be represented as the diagram in FIG. 1. In FIG. 1, each row in the shaded area represents the vector [h(L−1), h(L−2), . . . , h(1), h(0)], as shown in Equation 7.

Instead of estimating all of the elements in d, only the middle N elements of d are estimated. $\tilde{d}$ is the middle N elements as per Equation 9.

$$\tilde{d} = [d(0), \ldots, d(N-1)]^T \quad \text{Equation 9}$$

Using the same observation for r, an approximate linear relation between r and $\tilde{d}$ is per Equation 10.

$$r = \tilde{H}\tilde{d} + n \quad \text{Equation 10}$$

Figure 2:
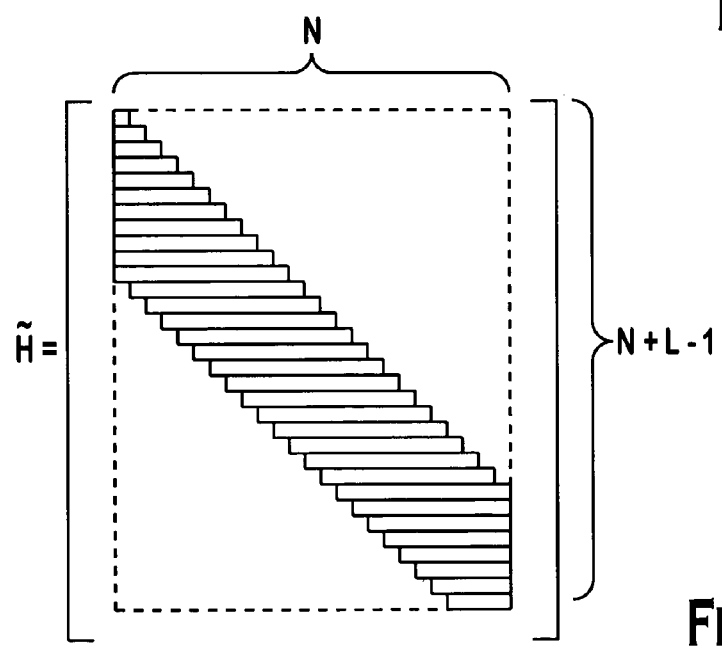
FIG. 2 is an illustration of a center portion of the banded channel response matrix.

Matrix $\tilde{H}$ can be represented as the diagram in FIG. 2 or as per Equation 11.

$$\tilde{H} = \begin{bmatrix} h(0) & 0 & \ldots \\ h(1) & h(0) & \ddots \\ \vdots & h(1) & \ddots & 0 \\ h(L-1) & \vdots & \ddots & h(0) \\ 0 & h(L-1) & \ddots & h(1) \\ \vdots & 0 & \ddots & \vdots \\ & & \ddots & h(L-1) \end{bmatrix} \quad \text{Equation 11}$$

As shown, the first L−1 and the last L−1 elements of r are not equal to the right hand side of the Equation 10. As a result, the elements at the two ends of vector d̂ will be estimated less accurately than those near the center. Due to this property, a sliding window approach, as described subsequently, is preferably used for estimation of transmitted samples, such as chips.

In each $k^{th}$ step of the sliding window approach, a certain number of the received samples are kept in r [k] with dimension N+L−1. They are used to estimate a set of transmitted data d̂[k] with dimension N using equation 10. After vector d̂[k] is estimated, only the "middle" part of the estimated vector d̂[k] is used for the further data processing, such as by despreading. The "lower" part (or the later in-time part) of d̂[k] is estimated again in the next step of the sliding window process in which r[k+1] and some new received samples, i.e. it is a shift (slide) version of r [k].

Although, preferably, the window size N and the sliding step size are design parameters, (based on delay spread of the channel (L), the accuracy requirement for the data estimation and the complexity limitation for implementation), the following using the window size of Equation 12 for illustrative purposes.

$$N = 4N_S \times SF \qquad \text{Equation 12}$$

SF is the spreading factor. Typical window sizes are 5 to 20 times larger than the channel impulse response, although other sizes may be used.

Figure 3:
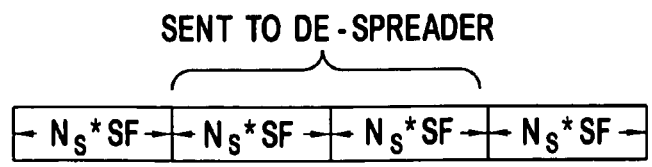
FIG. 3 is an illustration of a data vector window with one possible partitioning.

The sliding step size based on the window size of Equation 12 is, preferably, $2N_S \times SF$. $N_S \in \{1, 2, \ldots\}$ is, preferably, left as a design parameter. In addition, in each sliding step, the estimated chips that are sent to the despreader are $2N_S \times SF$ elements in the middle of the estimated d̂[k]. This procedure is illustrated in FIG. 3.

In the sliding window approach described above, the system model is approximated by throwing away some terms in the model. In the following, a technique is described where terms are kept by either using the information estimated in previous sliding step or characterizing the terms as noise in the model. The system model is corrected using the kept/characterized terms.

One algorithm of data detection uses an MMSE algorithm with model error correction uses a sliding window based approach and the system model of Equation 10.

Due to the approximation, the estimation of the data, such as chips, has error, especially, at the two ends of the data vector in each sliding step (the beginning and end). To correct this error, the H matrix in Equation 7 is partitioned into a block row matrix, as per Equation 13, (step 50).

$$H = [H_p | \tilde{H} | H_f] \qquad \text{Equation 13}$$

Subscript "p" stands for "past", and "f" stands for "future". H̃ is as per Equation 10. $H_p$ is per Equation 14.

$$H_p = \begin{bmatrix} h(L-1) & h(L-2) & \ldots & h(1) \\ 0 & h(L-1) & \ldots & h(2) \\ \vdots & \ddots & \ddots & \vdots \\ 0 & \ldots & 0 & h(L-1) \\ 0 & \ldots & \ldots & 0 \\ \vdots & \vdots & \vdots & \vdots \\ 0 & \ldots & \ldots & 0 \end{bmatrix} \in C^{(N+L-1) \times (L-1)} \qquad \text{Equation 14}$$

$H_f$ is per Equation 15.

$$H_f = \begin{bmatrix} 0 & \ldots & \ldots & 0 \\ \vdots & \vdots & \vdots & \vdots \\ 0 & \ldots & \ldots & 0 \\ h(0) & 0 & \ldots & 0 \\ \vdots & \ddots & \ddots & 0 \\ h(L-3) & \ldots & h(0) & 0 \\ h(L-2) & h(L-3) & \ldots & h(0) \end{bmatrix} \in C^{(N+L-1) \times (L-1)} \qquad \text{Equation 15}$$

The vector d is also partitioned into blocks as per Equation 16.

$$d = [d_p^T | \tilde{d}^T | d_f^T]^T \qquad \text{Equation 16}$$

d̃ is the same as per Equation 8 and $d_p$ is per Equation 17.

$$d_p = [d(-L+1)d(-L+2) \ldots d(-1)]^T \in C^{L-1} \qquad \text{Equation 17}$$

$d_f$ is per Equation 18.

$$d_f = [d(N)d(N+1) \ldots d(N+L-2)]^T \in C^{L-1} \qquad \text{Equation 18}$$

Figure 4:
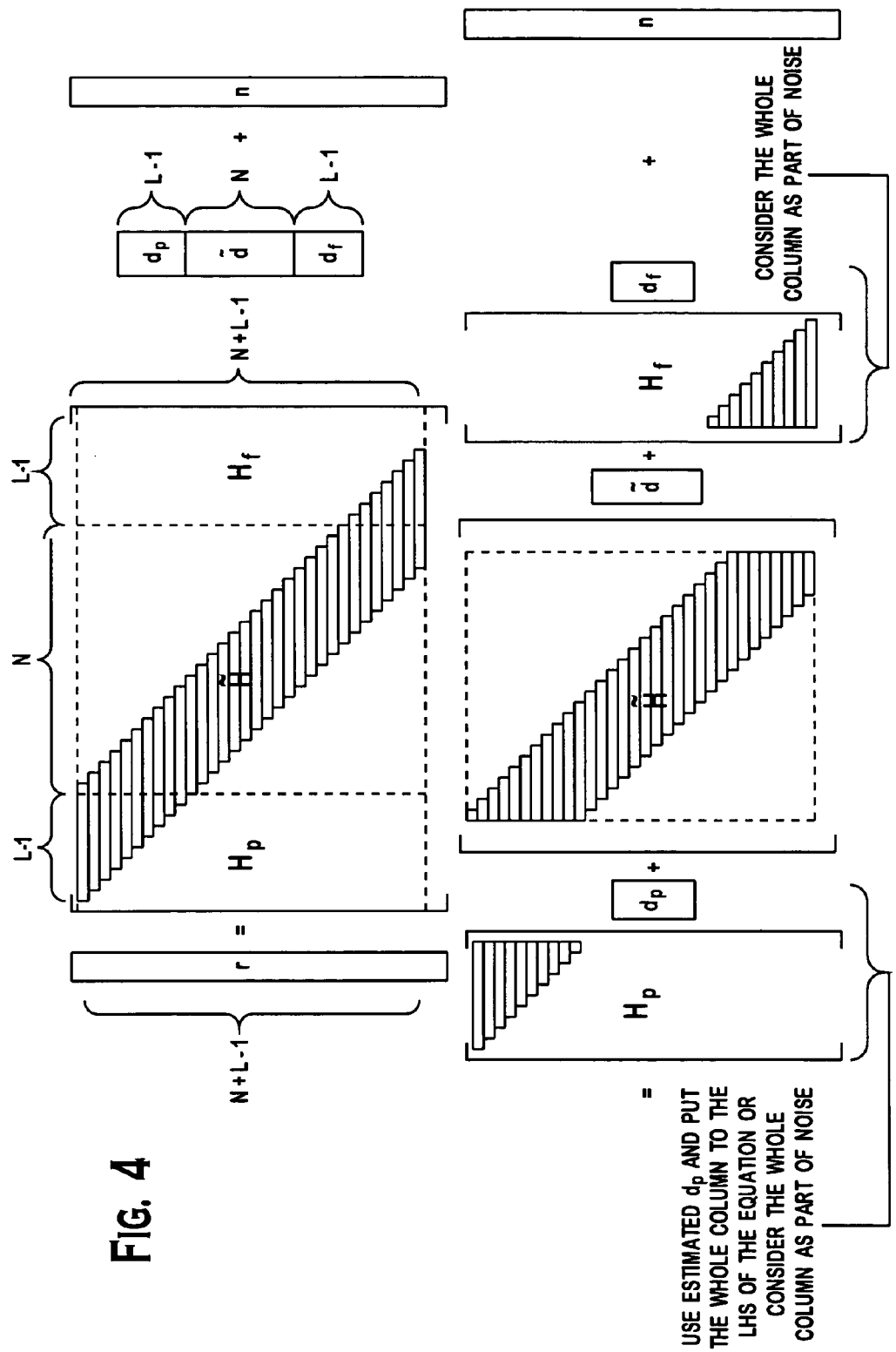
FIG. 4 is an illustration of a partitioned signal model.

The original system model is then per Equation 19 and is illustrated in FIG. 4.

$$r = H_p d_p + \tilde{H}\tilde{d} + H_f d_f + n \qquad \text{Equation 19}$$

One approach to model Equation 19 is per Equation 20.

$$\tilde{r} = \tilde{H}\tilde{d} + \tilde{n}_1$$

where $\tilde{r} = r - H_p d_p$ and $\tilde{n}_1 = H_f d_f + n$ \qquad Equation 20

Using an MMSE algorithm, the estimated data vector d̂ is per Equation 21.

$$\tilde{d} = g_d \tilde{H}^H (g_d \tilde{H}\tilde{H}^H + \Sigma_1)^{-1} \tilde{r} \qquad \text{Equation 21}$$

In Equation 21, $g_d$ is chip energy per Equation 22.

$$E\{d(i)d^*(j)\} = g_d \delta_{ij} \qquad \text{Equation 22}$$

r̂ is per Equation 23.

$$\tilde{r} = r - H_p \hat{d}_p \qquad \text{Equation 23}$$

$\hat{d}_p$, is part of the estimation of d̂ in the previous sliding window step. $\Sigma_1$ is the autocorrelation matrix of $\tilde{n}_1$, i.e., $\Sigma_1 = E\{\tilde{n}_1 \tilde{n}_1^H\}$. If assuming $H_f d_f$ and n are uncorrelated, Equation 24 results.

$$\Sigma_1 = g_d H_f H_f^H + E\{nn^H\} \qquad \text{Equation 24}$$

The reliability of $\hat{d}_p$ depends on the sliding window size (relative to the channel delay span L) and sliding step size.

Figure 5:
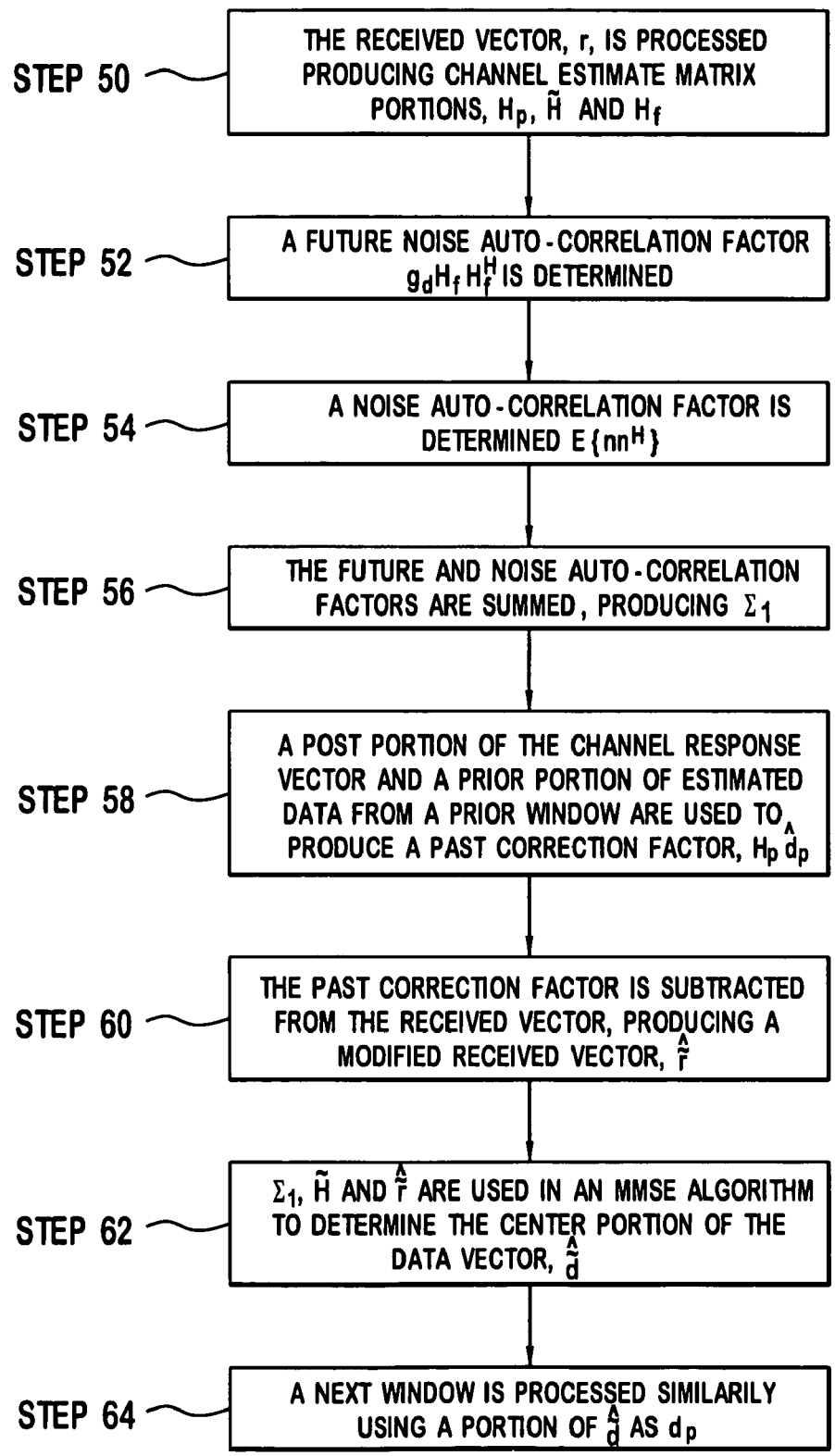
FIG. 5 is a flow diagram of sliding window data detection using a past correction factor.
Figure 6:
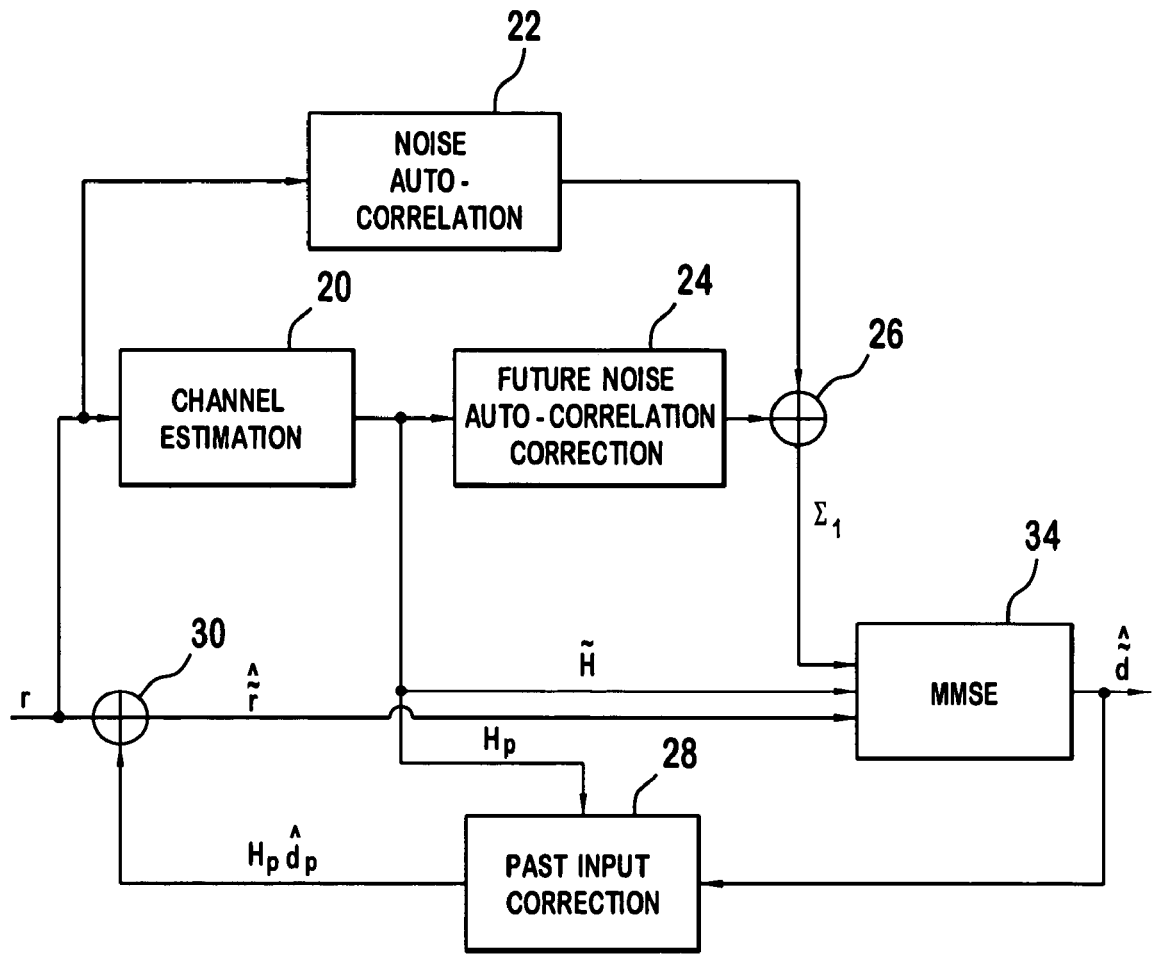
FIG. 6 is a receiver using sliding window data detection using a past correction factor.

This approach is also described in conjunction with the flow diagram of FIG. 5 and preferred receiver components of FIG. 6, which can be implemented in a WTRU or base station. The circuit of FIG. 6 can be implemented on a single integrated circuit (IC), such as an application specific integrated circuit (ASIC), on multiple IC's, as discrete components or as a combination of IC('s) and discrete components.

A channel estimation device 20 processes the received vector r producing the channel estimate matrix portions, $H_p$, H̃ and $H_f$, (step 50). A future noise auto-correlation device 24 determines a future noise auto-correlation factor, $g_d H_f H_f^H$, (step 52). A noise auto-correlation device 22 determines a noise auto-correlation factor, $E\{nn^H\}$, (step 54). A summer 26 sums the two factors together to produce $\Sigma_1$, (step 56).

A past input correction device 28 takes the past portion of the channel response matrix, $H_p$, and a past determined portion of the data vector, $\hat{d}_p$, to produce a past correction factor, $H_p \hat{d}_p$, (step 58). A subtractor 30 subtracts the past correction factor from the received vector producing a modified received vector, $\hat{r}$, (step 60). An MMSE device 34 uses $\Sigma_1$, $\tilde{H}$, and $\hat{r}$ to determine the received data vector center portion $\breve{d}$, such as per Equation 21, (step 62). The next window is determined in the same manner using a portion of $\breve{d}$ as $d_p$ in the next window determination, (step 64). As illustrated in this approach, only data for the portion of interest, $\breve{d}$, is determined reducing the complexity involved in the data detection and the truncating of unwanted portions of the data vector.

In another approach to data detection, only the noise term is corrected. In this approach, the system model is per Equation 25.

$$r = \tilde{H}d + \tilde{n}_2, \text{ where } \tilde{n}_2 = H_p d_p + H_f d_f + n \qquad \text{Equation 25}$$

Using an MMSE algorithm, the estimated data vector $\breve{d}$ is per Equation 26.

$$\breve{d} = g_d \tilde{H}^H (g_d \tilde{H}\tilde{H}^H + \Sigma_2)^{-1} r \qquad \text{Equation 26}$$

Assuming $H_p d_p$, $H_f d_f$ and n are uncorrelated, Equation 27 results.

$$\Sigma_2 = g_d H_p H_p^H + g_d H_f H_f^H + E\{nn^H\} \qquad \text{Equation 27}$$

To reduce the complexity in solving Equation 26 using Equation 27, a full matrix multiplication for $H_p H_p^H$ and $H_f H_f^H$ are not necessary, since only the upper and lower corner of $H_p$ and $H_f$, respectively, are non-zero, in general.

Figure 7:
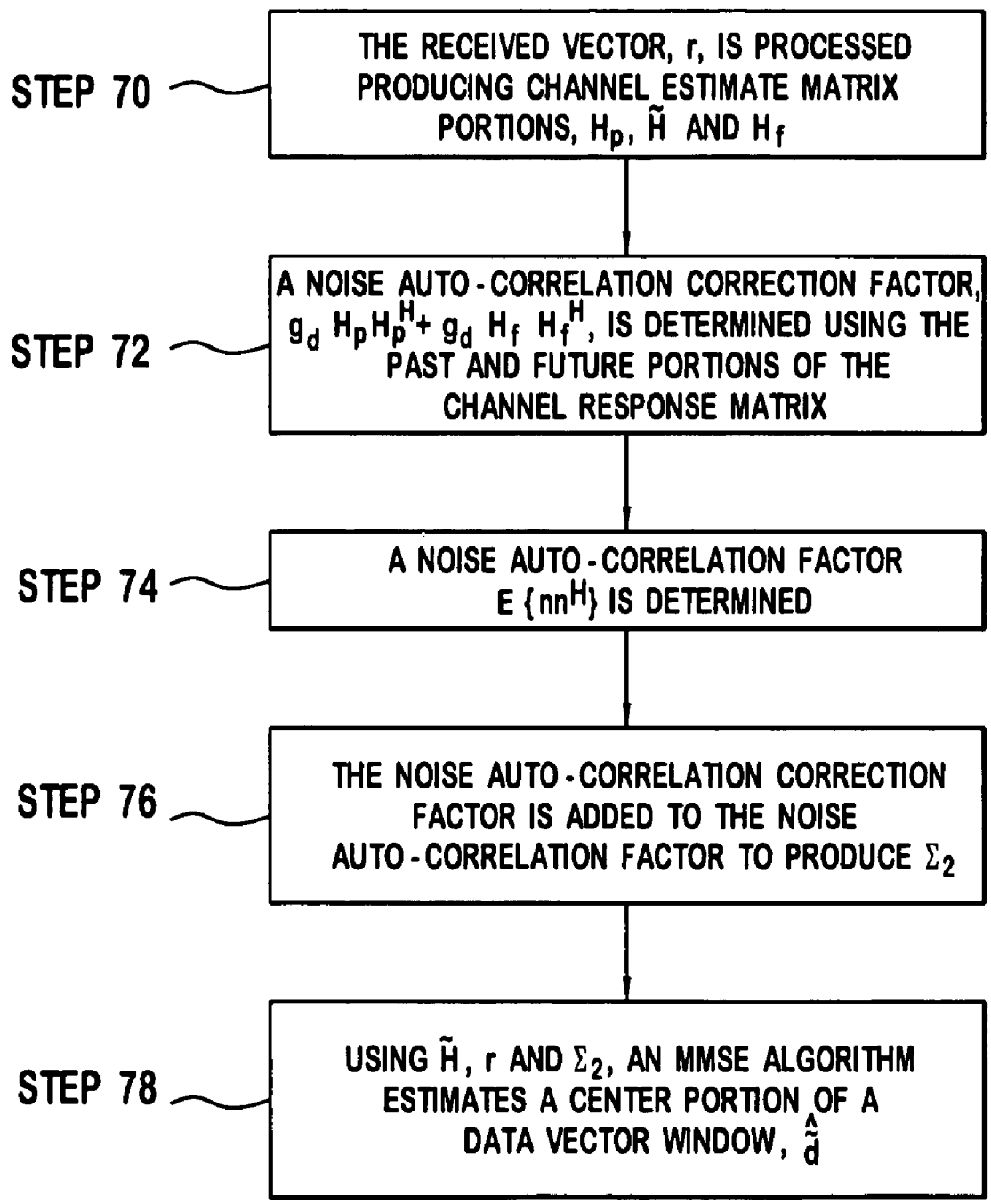
FIG. 7 is a flow diagram of sliding window data detection using a noise auto-correlation correction factor.
Figure 8:
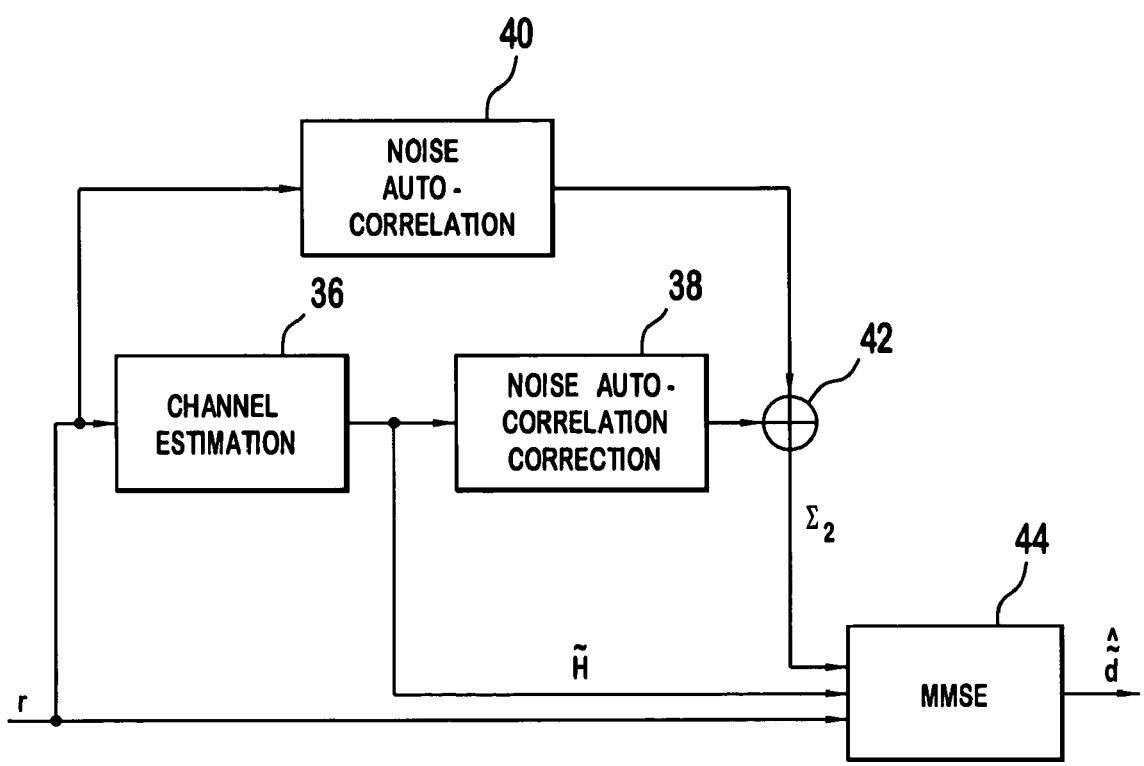
FIG. 8 is a receiver using sliding window data detection using a noise auto-correlation correction factor.

This approach is also described in conjunction with the flow diagram of FIG. 7 and preferred receiver components of FIG. 8, which can be implemented in a WTRU or base station. The circuit of FIG. 8 can be implemented on a single integrated circuit (IC), such as an application specific integrated circuit (ASIC), on multiple IC's, as discrete components or as a combination of IC('s) and discrete components.

A channel estimation device 36 processes the received vector producing the channel estimate matrix portions, $H_p$, $\tilde{H}$ and $H_f$, (step 70). A noise auto-correlation correction device 38 determines a noise auto-correlation correction factor, $g_d H_p H_p^H + g_d H_f H_f^H$, using the future and past portions of the channel response matrix, (step 72). A noise auto correlation device 40 determines a noise auto-correlation factor, $E\{nn^H\}$, (step 74). A summer 42 adds the noise auto-correlation correction factor to the noise auto-correlation factor to produce $\Sigma_2$, (step 76). An MMSE device 44 uses the center portion or the channel response matrix, $\tilde{H}$, the received vector, r, and $\Sigma_2$ to estimate the center portion of the data vector, $\breve{d}$, (step 78). One advantage to this approach is that a feedback loop using the detected data is not required. As a result, the different slided window version can be determined in parallel and not sequentially.

Discrete Fourier Transform Based Equalization

The sliding window approach described above requires a matrix inversion, which is a complex process. One embodiment for implementing a sliding window utilizes discrete Fourier transforms (DFTs), as follows. Although the preferred implementation of the DFT based approach is with a MMSE algorithm, it can be applied to other algorithms, such as a zero forcing (ZF) based algorithm.

A matrix $A_{cir} \in C^{N \times N}$, for some integer N, is a circulant matrix if it has the following form per Equation 28.

$$A_{cir} = \begin{bmatrix} a_1 & a_N & a_{N-1} & & a_2 \\ a_2 & a_1 & a_N & \ddots & \vdots \\ \vdots & a_2 & a_1 & \ddots & a_{N-1} \\ \vdots & \vdots & a_2 & \ddots & a_N \\ a_N & a_{N-1} & \vdots & & a_1 \end{bmatrix} \qquad \text{Equation 28}$$

This kind of matrix is expressed using the DFT and the IDFT operators, such as per Equation 29.

$$A_{cir} = F_N^{-1} \Lambda(A_{cir}[:,1]) F_N \qquad \text{Equation 29}$$

where, $A_{cir}[:,1] = (a_0, a_1, \ldots, a_N)^T \in C^N$, i.e. it is the first column of matrix $A_{cir}$.

Columns other than the first column can be used if properly permuted. $F_N$ is the N-point DFT matrix which is defined as, for any $x \in C^N$, as per Equation 30.

$$(F_N x)_k = \sum_{n=0}^{N-1} x(n) e^{j\frac{2\pi kn}{N}} \quad k = 0, \ldots, N-1 \qquad \text{Equation 30}$$

$F_N^{-1}$ is the N-point inverse DFT matrix which is defined as, for any $x \in C^N$, as per Equation 31.

$$(F_N^{-1} x)_k = \frac{1}{N}(F_N^* x)_k = \frac{1}{N}\sum_{n=0}^{N-1} x(n) e^{-j\frac{2\pi kn}{N}} \qquad \text{Equation 31}$$

$$k = 0, \ldots, N-1$$

$\Lambda_N(\cdot)$ is a diagonal matrix, which is defined as, for any $x \in C^N$, as per Equation 32.

$$\Lambda_N(x) = \text{diag}(F_N x) \qquad \text{Equation 32}$$

The inverse of matrix $A_{cir}$ is expressed, such as per Equation 33.

$$A_{cir}^{-1} = F_N^{-1} \Lambda_N^{-1}(A_{cir}[:,1]) F_N \qquad \text{Equation 33}$$

The following is an application of a DFT based approach to the data estimation process using the sliding window based chip level equalizer. The first embodiment uses a single receiving antenna. Subsequent embodiments use multiple receiving antennas.

The receiver system is modeled as per Equation 34.

$$r(t) = \sum_{k=-\infty}^{\infty} d(k) h(t - kT_c) + n(t) \qquad \text{Equation 34}$$

$$-\infty < t < \infty$$

$h(\cdot)$ is the impulse response of the channel. d(k) is the kth transmitted chip samples that is generated by spreading symbols using a spreading code. $r(\cdot)$ is the received signal. $n(\cdot)$ is the sum of additive noise and interference (intra-cell and inter-cell).

Using chip rate sampling and h(·) having a finite support, which means, in discrete-time domain, there is an integer L such that h(i)=0 for i<0 and i≧L, the sampled received signal can be expressed ($T_c$ is dropped for simplicity of the notations), as per Equation 35.

$$r(j) = \sum_{k=0}^{L-1} h(k)d(j-k) + n(j) \quad \text{Equation 35}$$

$$j \in \{\ldots, -2, -1, 0, 1, 2, \ldots\}$$

Based on M (M>L) received signals r(0), . . . , r(M−1), Equation 36 results.

$$r = Hd + n \quad \text{Equation 36}$$

where $$r = [r(0), \cdots, r(M-1)]^T \in C^M,$$

$$d = [d(-L+1), d(-L+2), \ldots, d(0), d(1), \ldots, d(M-1)]^T \in C^{M+L-1}$$

$$n = [n(0), \cdots, n(M-1)]^T \in C^M$$

$$H = \begin{bmatrix} h(L-1) & h(L-2) & \cdots & h(1) & h(0) & 0 & \cdots & \cdots \\ 0 & h(L-1) & h(L-2) & \cdots & h(1) & h(0) & 0 & \cdots \\ \vdots & \ddots & \ddots & \ddots & \ddots & \ddots & \ddots & \vdots \\ \cdots & \cdots & 0 & h(L-1) & h(L-2) & \cdots & h(1) & h(0) \end{bmatrix} \in C^{M \times (M+L-1)}$$

As illustrated by Equation 36, the H matrix is Toeplitz. As described subsequently in the application for multiple chip rate sampling and/or multiple receive antennas, the H matrix is block Toeplitz. Using the block Toeplitz property, discrete Fourier transform techniques can be applied. The Toeplitz/block Toeplitz nature is produced as a result of the convolution with one channel or the convolution of the input signal with a finite number of effective parallel channels. The effective parallel channels appear as a result of either oversampling or multiple receive antennas. For one channel, a single row is essentially slide down and to the right producing a Toeplitz matrix.

The statistics of the noise vector are treated as having the autocorrelation property, per Equation 37.

$$E\{n\, n^H\} = \sigma^2 I \quad \text{Equation 37}$$

The left hand side of equation (5) can be viewed as a "window" of continuous input signal stream. To estimate the data, an approximated model is used. In this approximated model, the first L−1 and the last L−1 elements of vector d are assumed to be zero before applying the MMSE algorithm and the reset M−L+1 elements of d forms a new vector $\tilde{d}=[d(0),\ldots,d(M-L+1)]^T$. The approximated model can be expressed explicitly as per Equation 38.

$$r = \tilde{H}\tilde{d} + n \quad \text{Equation 38}$$

where $\tilde{H} = \begin{bmatrix} h(0) & 0 & \cdots & \\ h(1) & h(0) & \ddots & \\ \vdots & h(1) & \ddots & 0 \\ h(L-1) & \vdots & \ddots & h(0) \\ 0 & h(L-1) & \ddots & h(1) \\ \vdots & 0 & \ddots & \vdots \\ & \vdots & \ddots & h(L-1) \end{bmatrix}$.

Figure 9:
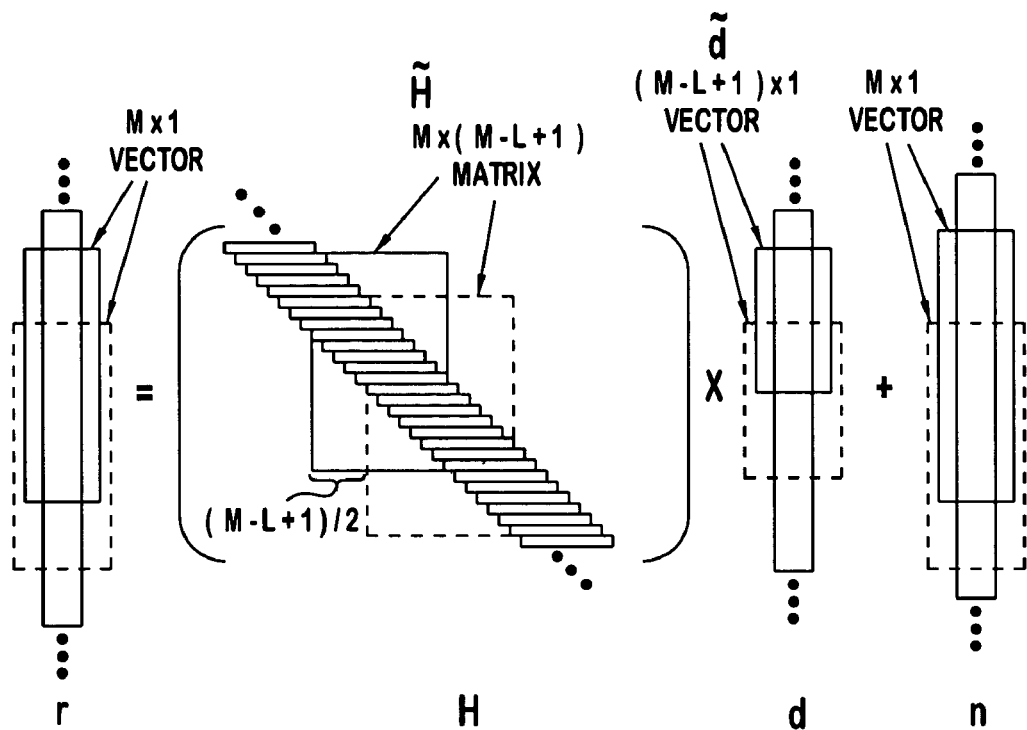
FIG. 9 is a graphical representation of the sliding window process.

After the vector $\tilde{d}$ is estimated, only the middle part of it is taken for de-spreading. Subsequently, the window of observation (i.e. the received signal) is slid by (M−L+1)/2 elements and the process is repeated. FIG. 9 is a graphical representation of the sliding window process, as described above.

Using MMSE algorithm, the estimated data is expressed per Equation 39.

$$\tilde{d} = R^{-1}\tilde{H}^H r$$

where $R = \tilde{H}^H \tilde{H} + \sigma^2 I$ \quad Equation 39

In Equation 39, neither the matrix R nor the matrix $\tilde{H}$ is circulant to facilitate a DFT implementation. To facilitate a DFT implementation, for each sliding step, the approximated system model per Equation 40 is used.

$$r = \breve{H}\breve{d} + n \qquad \text{Equation 40}$$

$$\text{where } \breve{H} = \begin{bmatrix} h(0) & 0 & \cdots & & & & \\ h(1) & h(0) & \ddots & & & & \\ \vdots & h(1) & \ddots & 0 & & & \\ h(L-1) & \vdots & \ddots & h(0) & 0 & & \\ 0 & h(L-1) & \ddots & h(1) & h(0) & \ddots & \\ \vdots & 0 & \ddots & \vdots & \vdots & \ddots & 0 \\ & & \vdots & \ddots & h(L-1) & h(L-2) & \cdots & h(0) \end{bmatrix} \in C^{M \times M}$$

$$\breve{d} = [d(0), \ldots, d(M-1)]^T \in C^{M \times 1}$$

In Equation 40, only the first L−1 elements (equations) are approximations of those of Equation 36.

The matrix $\breve{H}$ is replaces by a circulant matrix, such as per Equation 41.

Figure 10:
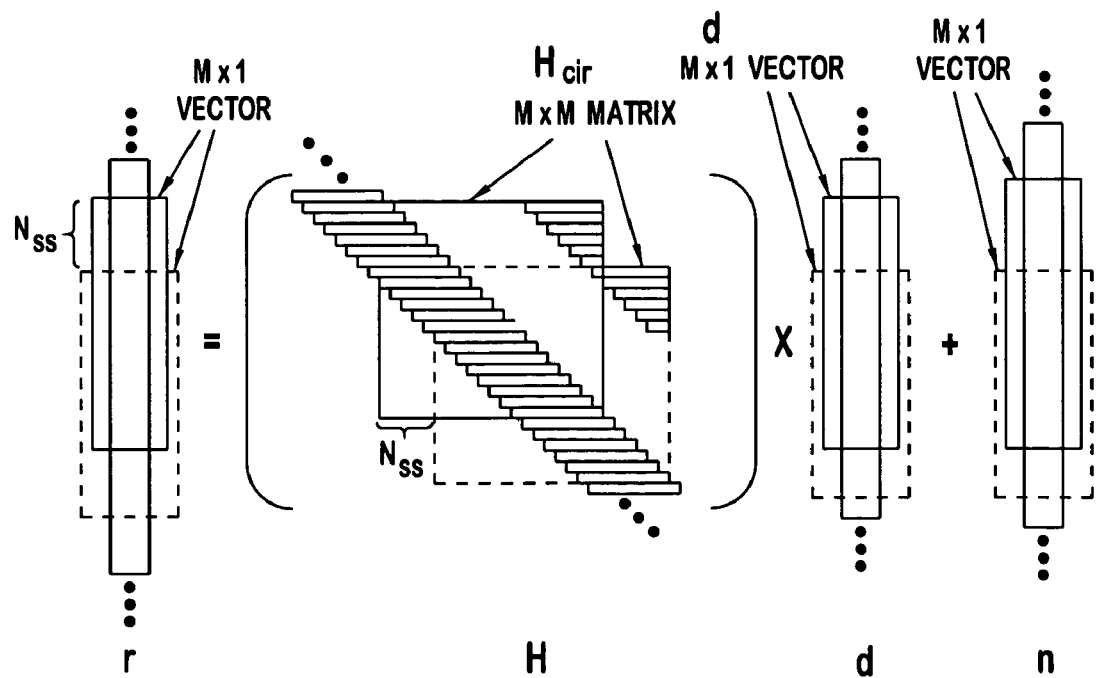
FIG. 10 is a graphical representation of the sliding window process using a circulant approximation.

This distortion makes the two ends of the estimated vector d inaccurate. FIG. 10 is a graphical representation of the model construction process.

$$H_{cir} = \begin{bmatrix} h(0) & 0 & \cdots & 0 & h(L-1) & \cdots & h(1) \\ h(1) & h(0) & \ddots & \vdots & 0 & \ddots & \vdots \\ \vdots & h(1) & \ddots & 0 & \vdots & & h(L-1) \\ h(L-1) & \vdots & \ddots & h(0) & 0 & \ddots & 0 \\ 0 & h(L-1) & \ddots & h(1) & h(0) & \ddots & \vdots \\ \vdots & 0 & \ddots & \vdots & \vdots & \ddots & 0 \\ 0 & \vdots & \ddots & h(L-1) & h(L-2) & \cdots & h(0) \end{bmatrix} \qquad \text{Equation 41}$$

The system model, for each sliding step, is per Equation 42.

$$r = H_{cir}d + n$$

$$\text{with } d = [d(0), \ldots, d(M-1)]^T \epsilon C^{M \times 1} \qquad \text{Equation 42}$$

The vector d in Equation 42, due to the new model, is different than the vector d in Equation 36. Equation 42 adds additional distortion to the first L−1 element of Equation 39.

Using approximated model per Equation 42, the MMSE algorithm yields the estimated data as per Equation 43.

$$\hat{d} = R_{cir}^{-1} H_{cir}^H r$$

$$\text{where } R_{cir} = H_{cir}^H H_{cir} + \sigma^2 I \qquad \text{Equation 43}$$

Both $H_{cir}^H$ and $R_{cir}$ are circulant and $R_{cir}$ is of the form per Equation 44.

$$R_{cir} = \begin{bmatrix} R_0 & R_1 & \cdots & R_{L-1} & 0 & 0 & \cdots & & & R_2^* & R_1^* \\ R_1^* & R_0 & \ddots & & R_{L-1} & 0 & \ddots & & & & \vdots \\ \vdots & R_1^* & \ddots & R_1 & & R_{L-1} & \ddots & 0 & & R_{L-1}^* & \vdots \\ R_{L-1}^* & & \ddots & R_0 & R_1 & & \ddots & 0 & 0 & 0 & R_{L-1}^* \\ 0 & R_{L-1}^* & & R_1^* & R_0 & \ddots & & R_{L-1} & 0 & \vdots & 0 \\ \vdots & 0 & \ddots & & R_1^* & \ddots & \ddots & & R_{L-1} & \ddots & 0 & \vdots \\ 0 & \vdots & \ddots & R_{L-1}^* & & \ddots & \ddots & R_1 & & \ddots & 0 & 0 \\ R_{L-1} & 0 & \ddots & 0 & R_{L-1}^* & & \ddots & R_0 & R_1 & & R_{L-1} & 0 \\ \vdots & R_{L-1} & & \vdots & 0 & R_{L-1}^* & & R_1^* & R_0 & \ddots & & R_{L-1} \\ \vdots & \vdots & \ddots & & 0 & 0 & \ddots & & R_1^* & \ddots & R_1 \\ \vdots & \vdots & \ddots & & & 0 & \ddots & R_{L-1}^* & & \ddots & R_0 & R_1 \\ R_1 & R_2 & \cdots & 0 & & & \cdots & 0 & 0 & R_{L-1}^* & \cdots & R_1^* & R_0 \end{bmatrix}$$

Equation 44

Applying the properties of circulant matrices, the estimated data is per Equation 45.

$$\hat{d} = F_M^{-1} \Lambda_M^{-1} (R_{cir}[:,1]) \Lambda_M (H_{cir}^H[:,1]) F_M r \quad \text{Equation 45}$$

Figure 11:
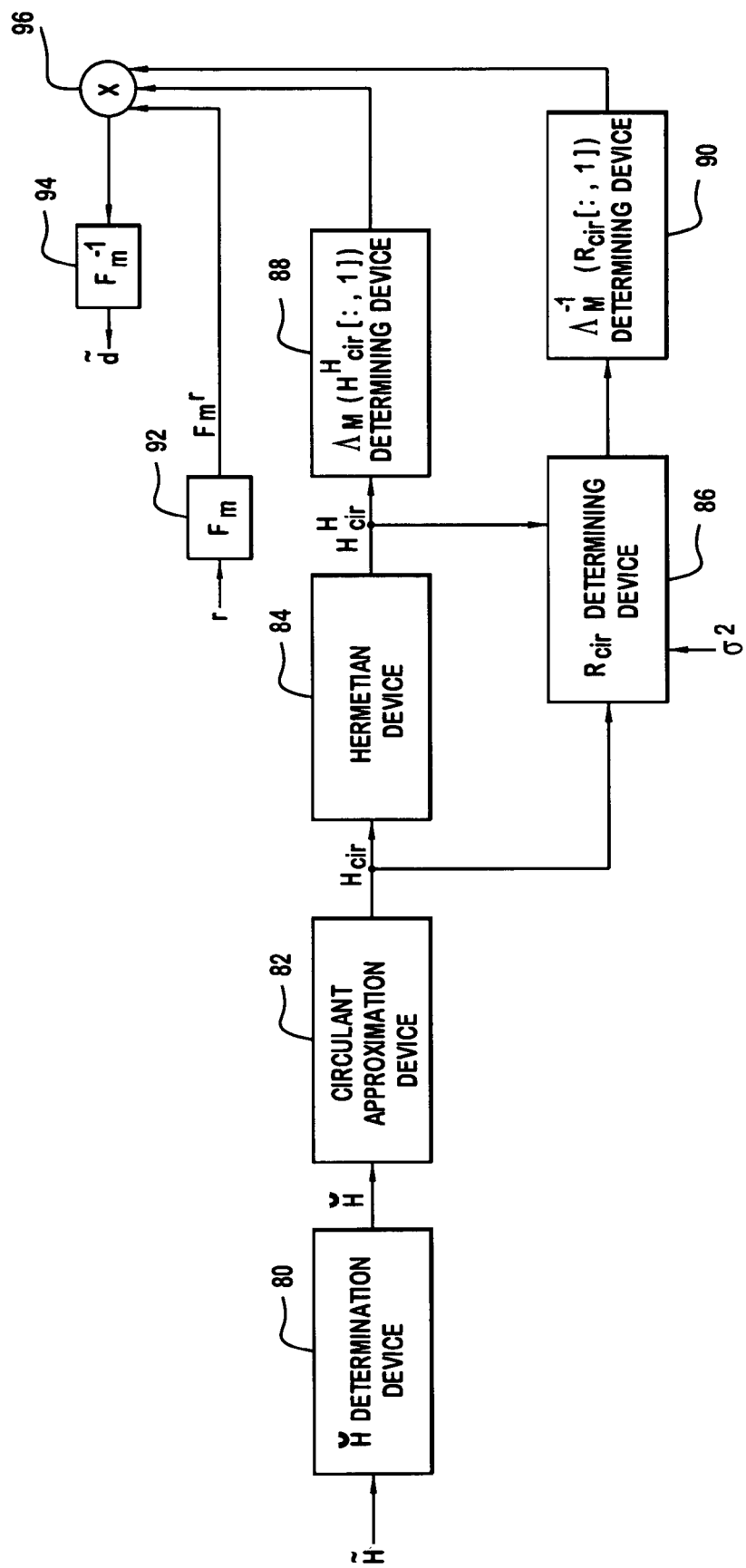
FIG. 11 is a circuit for an embodiment for detecting data using discrete Fourier transforms (DFTs).

FIG. 11 is a diagram of a circuit for estimating the data per Equation 45. The circuit of FIG. 11 can be implemented on a single integrated circuit (IC), such as an application specific integrated circuit (ASIC), on multiple IC's, as discrete components or as a combination of IC('s) and discrete components.

The estimated channel response $\tilde{H}$ is processed by an $\check{H}$ determination device 80 to determine the Toeplitz matrix $\check{H}$. A circulant approximation device 82 processes $\check{H}$ to produce a circulant matrix $H_{cir}$. A Hermetian device 84 produces the Hermetian of $H_{cir}$, $H_{cir}^H$. Using $H_{cir}$, $H_{cir}^H$ and the noise variance $\sigma^2$, $R_{cir}$ is determined by a $R_{cir}$ determining device 86. Using a first column of $H_{cir}^H$, a diagonal matrix is determined by a $\Lambda_M(H_{cir}^H[:,1])$ determining device 88. Using a first column of $R_{cir}$, an inverse diagonal matrix is determined by a $\Lambda_M^{-1}(R_{cir}[:,1])$ determination device 90. A discrete Fourier transform device 92 performs a transform on the received vector, r. The diagonal, inverse diagonal and Fourier transform result are multiplied together by a multiplier 96. An inverse Fourier transform device 94 takes an inverse transform of the result of the multiplication to produce the data vector $\hat{d}$.

The sliding window approach is based on an assumption that the channel is invariant within each sliding window. The channel impulse response near the beginning of the sliding window may be used for each sliding step.

One preferred approach for determining the window step size $N_{SS}$ and window size M is per Equation 46, although others may be used.

$$N_{SS} = 2N_{symbol} \times SF \text{ and } M = 4N_{symbol} \times SF \quad \text{Equation 46}$$

$N_{symbol} \in \{1, 2, \ldots\}$ is the number of symbols and is a design parameter which should be selected, such that M>L. Since M is also the parameter for DFT which may be implemented using FFT algorithm. M may be made large enough such that the radix-2 FFT or a prime factor algorithm (PFA) FFT can be applied. After the data is estimated, $2N_{symbol} \times SF$ samples are taken to process despreading starting from $N_{symbol} \times SF^{th}$ sample. FIG. 11 is an illustration of taking the samples for despreading.

Multiple Receive Antenna Equalization

The following is an embodiment using multiple receive antennas, such as K receive antennas. Samples of the received vector and estimates of the channel impulse response are taken for each antenna independently. Following the same process as for the single antenna embodiment, each antenna input, $r_k$, is approximated per Equation 47.

$$r_k = H_{cir,k} d + n_k \text{ for } k=1, \ldots, K \quad \text{Equation 47}$$

or in block matrix form per Equation 48

$$\begin{bmatrix} r_1 \\ r_2 \\ \vdots \\ r_K \end{bmatrix} = \begin{bmatrix} H_{cir,1} \\ H_{cir,2} \\ \vdots \\ H_{cir,K} \end{bmatrix} d + \begin{bmatrix} n_1 \\ n_2 \\ \vdots \\ n_K \end{bmatrix} \quad \text{Equation 48}$$

Equations 49 and 50 are estimates of the auto-correlation and cross-correlation properties of the noise terms.

$$E\{n_k n_k^H\} = \sigma^2 I \text{ for } k=1, \ldots, K \quad \text{Equation 49}$$

and $$E\{n_k n_j^H\} = 0 \text{ for } k \neq j \quad \text{Equation 50}$$

Applying MMSE algorithm, the estimated data can be expressed as per Equation 51.

$$\hat{d} = R_{cir}^{-1} \sum_{k=1}^{K} H_{cir,k}^H r_k \quad \text{Equation 51}$$

where $R_{cir} = \sum_{k=1}^{K} H_{cir,k}^H H_{cir,k} + \sigma^2 I$ $R_{cir}$ is still a circulant matrix and the estimated data can be determined per Equation 52.

$$\hat{d} = F_M^{-1} \Lambda_M^{-1}(R_{cir}[:,1]) \sum_{k=1}^{K} \Lambda_M(H_{cir,k}^H[:,1]) F_M r_k \quad \text{Equation 52}$$

If the receive antennas are positioned close to each other, the noise terms may be correlated in both time and space. As a result, some degradation in the performance may result.

Multiple Chip Rate Sampling (Oversampling) Equalization

The following describes embodiments using a sliding window based equalization approach with multiple chip rate sampling. Multiple chip rate sampling is when the channel is sampled at a sampling rate which is an integer multiple of the chip rate, such as two times, three times, etc. Although the following concentrates on two times per chip sampling, these approaches can be applied to other multiples.

Using a sliding window of width of N chips and two time chip rate sampling, our received vector is $r=[r_0, r_1, \ldots, r_{2N-1}]^T$. This vector may be rearranged and separated into an even received vector $r_e=[r_0, r_2, \ldots, r_{2N-2}]^T$ and an odd received vector $r_o=[r_1, r_3, \ldots, r_{2N-1}]^T$, with $r=[r_e, r_o]^T$. Without loss of generality, the data transmission model is per Equation 53.

$$\begin{bmatrix} r_e \\ r_o \end{bmatrix} = \begin{bmatrix} H_e \\ H_o \end{bmatrix} d + \begin{bmatrix} n_e \\ n_o \end{bmatrix} \quad \text{Equation 53}$$

Equation 53 separates the effective 2-sample-per-chip discrete-time channel into two chip-rate discrete-time channels.

The matrices $H_e$ and $H_o$ in Equation 53 are, correspondingly, the even and odd channel response matrices. These matrices are constructed from the even and odd channel response vectors $h_e$ and $h_o$, which are obtained by sampling the channel response at 2 samples per chip and separating it into the even and odd channel response vectors.

The channel noise is modeled as white with a variance $\sigma^2$, as per Eqaution 54.

$$E[n_e n_e^H] = E[n_o n_o^H] = \sigma^2 I \quad \text{Equation 54}$$

If the channel is an additive white Gaussian noise (AWGN) channel and the received data is provided directly from the sampled channel, then Equation 55 results.

$$E[n_e n_o^H] = 0 \quad \text{Equation 55}$$

As a result, the problem is mathematically similar to the case of the chip-rate equalizer for 2 receive antennas with uncorrelated noise, as previously described. However, the received antenna signals in many implementations are processed by a receive-side root-raised cosine (RRC) filter before being provided to the digital receiver logic for further processing. Following such processing, the received noise vector is no longer white, but has a raised-cosine (RC) autocorrelation function. RC is the frequency-domain square of a RRC response. Since the RC pulse is a Nyquist pulse, Equation 54 holds, however Equation 55 does not. The $(i,j)^{th}$ element of the matrix $$\Lambda_{cross} \stackrel{def}{=} \frac{1}{\sigma^2} E[n_e n_o^H]$$

is per Equation 56.

$$\frac{1}{\sigma^2} E[n_e n_o^H]_{(i,j)} = x_{RC}(|i-j| + 0.5) \quad \text{Equation 56}$$

$x_{RC}$ is the unity-symbol-time normalized RC pulse shape.

Properties of $\Lambda_{cross}$ are it is real, symmetric and Toeplitz; it is not banded and has no zero entries and its entries do get smaller and tend to 0 as they get farther and farther away from the main diagonal.

$\Sigma_n$ represent the cross-correlation matrix of the total noise vector and is per Equation 57.

$$\Sigma_n = \sigma^2 \begin{bmatrix} I & \Sigma_{cross} \\ \Sigma_{cross} & I \end{bmatrix} \quad \text{Equation 57}$$

Exact Solution

The exact solution to the problem of linear minimum mean-square estimation of d from the observation of r is per Equation 58.

$$\hat{d}_{MMSE} = (H^H \Sigma_n^{-1} H + I)^{-1} H^H \Sigma_n^{-1} r$$

where $y = H^H \Sigma_n^{-1} r$ is the whitening matched filtering (WMF)

$$\hat{d}_{MMSE} = (H^H \Sigma_n^{-1} H + I)^{-1} y$$

is the linear MMSE equalization Equation 58
Neither $$H^H \Sigma_n^{-1} \text{ nor } H^H \Sigma_n^{-1} H + I$$

are Toeplitz and neither can be made Toeplitz through elemental unitary operations (e.g. row/column re-arrangements), due to the structure of $\Sigma_n$. Accordingly, DFT-based methods based on circulant approximations of Toeplitz matrices cannot be applied here and an exact solution is highly complex.

Two embodiments for deriving an efficient algorithm for solving this problem are described. The first embodiment uses a simple approximation and the second embodiment uses an almost-exact solution.

Simple Approximation

The simple approximation ignores the correlation between $n_e$ and $n_o$, $\Sigma_{cross}=0$. As a result, the same approach as multiple chip-rate receive antennas is used.

The complexity of this simple approximation approach is as follows. N-chip data blocks are considered. For rough approximation, an N-point DFT complexity, given by NlogN operations per second (ops), is assumed. Additionally, N-point vector multiplications are assumed to take N ops and vector additions are ignored.

The complexity of the DFT-based approach can be roughly partitioned into 2 components: the processing which has to be performed on every received data set and the processing which is performed when the channel estimate is updated, which is typically done one to two orders of magnitude less frequently then the former operation.

For processing performed on each received data set, the following operations are performed: 2 N-point DFTs to transform the received vector into the frequency domain; 2 N-point vector multiplications (multiply each received vector by the appropriate "state" vector); and one more DFT to transform the result back into time domain. Thus, the approximate complexity is per Equation 59.

$$C_{1,r} = 3N \log N + 2N \quad \text{Equation 59}$$

For processing performed when the channel response is updated, the following operations are performed: 2 DFT operations, 6 N-point vector multiplies and a vector division, which need to be taken 10 times the operations of a vector multiply. Thus, the complexity of this step is roughly given per Equation 60.

$$C_{1,r}=2N \log N+16N \qquad \text{Equation 60}$$

Almost Exact Solution

For the almost-exact solution which uses a block-Toeplitz solution, the vector and matrices are rearranged in their natural order, such that the vector r is given by $r=[r_0, r_1, \ldots, r_{2N-1}]^T$. Equation 61 is the natural order model.

$$r=H_{bT}d+n$$

where $H_{bT}$ is defined as $$H_{bT} = \begin{bmatrix} h_{e,1} \\ h_{o,1} \\ \vdots \\ h_{o,N} \end{bmatrix} = \begin{bmatrix} G_1 \\ G_2 \\ \vdots \\ G_N \end{bmatrix} \qquad \text{Equation 61}$$

$h_{e,i}$ is the $i^{th}$ row of $H_e$ and $h_{o,i}$ is the $i^{th}$ row of $H_o$. $G_i$ is a 2×N matrix whose $1^{st}$ row is $h_{e,i}$ and whose $2^{nd}$ row is $h_{o,i}$. Using $G_i$ [x,y] as the row-x, column-y element of $G_i$, $H_{bT}$ is block-Toeplitz as illustrated in Equation 62.

$$G_i[x,y]=G_j[x,y+(i-j)]$$

provided that $1 \leq y+(i-j) \leq N$ \qquad Equation 62

The block-Toeplitz structure of $H_{bT}$ follows immediately from the Toeplitz structure of $H_e$ and $H_o$ and the row-rearrangement. From the Toeplitz structure of I and $\Sigma_{cross}$, the autocorrelation matrix of the noise in the re-defined problem is also block Toeplitz. Because this matrix is also symmetric, it can be rewritten per Equation 63.

$$\Sigma_{bT}[\Sigma_{i,j}]_{1 \leq i,j \leq N}$$

where $\Sigma_{i,j}$ are 2×2 matrices with the property that
$$\Sigma_{i,j}=\Sigma_{|i-j|} \qquad \text{Equation 63}$$

Subsequently, block-circulant approximations to the block-Toeplitz matrices are produced. Since the $H_{bT}$ matrix is also banded, the block circulant approximation of $H_{bT}$ is then obtained directly. However, $\Sigma_{bT}$ is not banded and therefore it is not possible to produce a block-circulant approximation directly from it. Since the elements of $\Lambda_{bT}$ tend to 0 as they get farther away from the main diagonal, a banded approximation to $\Sigma_{bT}$ is per Equation 64.

$$\Sigma_{bT} \approx \tilde{\Sigma}_{bT}=[\tilde{\Sigma}_{i,j}]_{1 \leq i,j \leq N}$$

where $\tilde{\Sigma}_{i,j}$ are 2×2 matrices with the property that $$\tilde{\Sigma}_{i,j}=\Sigma_{|i-j|} \text{ if } |i-j| \leq B_n \text{ and } \tilde{\Sigma}_{i,j}=0 \text{ otherwise} \qquad \text{Equation 64}$$

The noise-covariance-bandwidth, $B_n$, is a design parameters that is selected. Due to the decay properties of the RC pulse shape, it is likely to be only several chip. Now $\tilde{\Sigma}_{bT}$ is banded block-Toeplitz and a circulant approximation to it is produced.

The circulant approximations of $H_{bT}$ and $\tilde{\Sigma}_{bT}$ are $H_{bC}$ and $\Sigma_{bC}$, respectively. $W_n$ denotes the n-point DFT matrix, that is if x is an n-vector, then $x_f=W_n x$ is the DFT of x. A block-circulant matrix C is of the form of Equation 65.

$$C = \begin{bmatrix} C_1 & C_2 & \cdots & C_M \\ C_2 & C_3 & \cdots & C_1 \\ \vdots & \vdots & \ddots & \vdots \\ C_M & C_1 & \cdots & C_{M-1} \end{bmatrix}$$

where $C_i$ is an N×N matrix and therefore C is an MN×MN matrix Equation 65

C can also be written as Equation 66.

$$C=W_{M \times N}^{-1} \Lambda_{M \times N}(C) W_{M \times N}$$

where $W_{M \times N}$ is the block-N-DFT matrix defined as
$$W_{M \times N}=W_M I_N \qquad \text{Equation 66}$$

$\Lambda_{M \times N}(C)$ is a block diagonal matrix that depends on C and is given by Equation 67.

$$\Lambda_{M \times N}(C) = \begin{bmatrix} \Lambda_1(C) & & & \\ & \Lambda_2(C) & & \\ & & \ddots & \\ & & & \Lambda_M(C) \end{bmatrix} \qquad \text{Equation 67}$$

$\Lambda_i(C)$ is an N×N matrix. To completely specify $\Lambda_i(C)$, $\lambda_{i,(k,l)}$ denotes the $(k,l)^{th}$ element of $\Lambda_i(C)$ and is defined as $$\lambda_{(k,l)} \overset{def}{=} [\lambda_{1,(k,l)}, \lambda_{2,(k,l)}, \ldots, \lambda_{M,(k,l)}]^T \cdot c_{i,(k,l)}$$

denotes the $(k,l)^{th}$ element of C and is defined as $$c_{(k,l)} \overset{def}{=} [c_{1,(k,l)}, c_{2,(k,l)}, \ldots, c_{M,(k,l)}]^T \cdot \lambda_{(k,l)}$$

is the M-point DFT of $c_{(k,l)}$ and is per Equation 68.

$$\lambda_{(k,l)}=W_M c_{(k,l)} \qquad \text{Equation 68}$$

Equations 66–68 specify the block-DFT representation of square block circulant matrices. $N^2$ DFTs are required to compute $\Lambda_{M \times N}(C)$.

The MMSE estimator is rewritten per Equation 69.

$$d_{MMSE}=H^H(\Sigma_n+HH^H)^{-1}r \qquad \text{Equation 69}$$

The MMSE estimator form as per Equation 68 has several advantages. It requires only a single inverse matrix computation and thus in the DFT domain only a single vector division. This provides a potentially significant savings as divisions are highly complex.

The almost-exact solution has two steps in the most preferred embodiment, although other approaches may be used. Every time a new channel estimate is obtained, the channel filter is updated, $(H^H(\Sigma_n+HH^H)^{-1}$ is determined). For every data block, this filter is applied to the received data block. This partition is utilized because the channel is updated very infrequently compared to the received data block processing and therefore significant complexity reduction can achieved by separating the overall process into these two steps.

The DFT of $\Sigma_n$ is the DFT of the pulse shaping filter multiplied by the noise variance $\sigma^2$. Since the pulse shaping filter is typically a fixed feature of the system, its DFT can be precomputed and stored in memory and thus only the value $\sigma^2$ is updated. Since the pulse-shaping filter is likely to be close to the "ideal" (IIR) pulse shape, the DFT of the ideal pulse shape can be used for $\Sigma_n$, reducing the complexity and is also far away from the carrier.

To channel update step, the following is performed:
1. The "block-DFT" of H needs to be computed. Since the block is of width 2, it requires 2 DFTs. The result is a N×2 matrix whose rows are the DFTs of $h_e$ and $h_o$.
2. The "block-DFT" of $HH^H$ is computed by finding element-by-element autocorrelations and the crosscorrelation of $h_e$ and $h_o$. This required 6N complex multiplies and 2N complex adds: the products of N 2×2 matrices are computed with there own Hermitian transposes.
3. The block-DFT of $\Sigma_n$ is added, which requires 3N multiplies (scale the stored block-DFT of the RRC filter by $\sigma^2$) and 3N adds to add the block-DFT of the two matrices.
4. An inverse of $\Sigma_n + HH^H$ is taken in the block-DFT domain. To do this an inverse of each of the N 2×2 matrices is taken in the block-DFT domain. To estimate the total number of operations, consider a Hermitian matrix $$M = \begin{bmatrix} a & b \\ b^* & a \end{bmatrix}.$$

The inverse of this matrix is given per Equation 70.

$$M^{-1} = \frac{1}{a^2 - |b|^2} \begin{bmatrix} a & -b \\ -b^* & a \end{bmatrix} \quad \text{Equation 70}$$

Accordingly, the complexity of computing each inverse involves 3 real multiplications and 1 real subtraction (roughly 1 complex multiply) and 1 real division.
5. The result are block-multiplied by the block-DFT of $H^H$, which, takes a total of 8N multiplies+4N adds (since $H^H$ is not Hermitian).

To summarize, the following computation are required: 2 N-point DFTs; 18N complex multiplies (17 N-point vector multiplies+N stand-alone multiplies); 11N complex adds (11 N-point vector adds); and 1N real divisions.

The complexity of processing a data block r of 2N values (N chips long) involves: 2 N-point DFTs; one product of the N-point block-DFTs (filter and data), which required 8N complex multiplies and 4N complex adds; and 1 N-point inverse DFTs.

To summarize, the following is required: 3 N-point DFTs; 8N complex multiplies (8 N-point vector multiplies); and 4N complex adds (4 N-point vector adds).

Multiple Chip Rate Sampling and Multiple Receive Antenna Equalization

The following are embodiments using multiple chip rate sampling and multiple receive antennas. For L receive antennas, 2L channel matrices—one "even" and one "odd" matrix for each antenna result. The channel matrices for $l^{th}$ antenna are denoted as $H_{l,e}$ and $H_{l,o}$ and $h_{l,e,n}$ and $h_{l,o,n}$ denote the $n^{th}$ row of such matrix. Each channel matrix is Toeplitz and with the appropriate re-arrangement of rows the joint channel matrix is a block-Toeplitz matrix, per Equation 71.

$$H_{bT} = \begin{bmatrix} h_{1,e,1} \\ h_{1,o,1} \\ \vdots \\ h_{L,o,N} \end{bmatrix} = \begin{bmatrix} G_1 \\ G_2 \\ \vdots \\ G_N \end{bmatrix} \quad \text{Equation 71}$$

The matrices $G_i$ are the Toeplitz blocks of $H_{bT}$. Each $G_i$ is a 2L×N matrix.

Estimating the vector d from the received observations r can be modeled per Equation 72.

$$r = H_{bT}d + n \quad \text{Equation 72}$$

The MMSE estimation formulation is per Equation 73.

$$d_{MMSE} = H_{bT}^H (\Sigma_n + H_{bT}H_{bT}^H)^{-1} r \quad \text{Equation 73}$$

$\Sigma_n$ is the covariance of the noise vector n. The form that the solution of Equation 73 depends on the assumptions that are made for $\Sigma_n$. The introduction of the multiple receive antenna introduces an additional spatial dimension. Although the interplay of temporal and spatial correlations can be extremely complex, it can be assumed that the spatial correlation properties of the noise do not interplay with the temporal correlation properties, except as a direct product of the two, as per Equation 74.

$$\Sigma_n = \Sigma_{n,1\,ant} \Sigma_{sp} \quad \text{Equation 74}$$

$\Sigma_{n,1\,ant}$ is the noise covariance matrix of the noise observed at a single antenna as per Equation 57. $\Sigma_{n,1\,ant}$ is of dimension 2N×2N. $\Sigma_{sp}$ is the normalized synchronous spatial covariance matrix, i.e. it is the covariance matrix between the L noise samples observed at the L antennas at the same time normalized to have 1's on the main diagonal denotes the Kroenecker product.

$\Sigma_n$ is a 2LN×2LN Hermitian positive semi-definite matrix, which is block-Toeplitz with 2L×2L blocks. To estimate the data, four preferred embodiments are described: an exact solution; a simplification by assuming that the L receive antenna have uncorrelated noise; a simplification by ignoring the temporal correlation of the noise in the odd and even streams from the same antenna; and a simplification by assuming that all 2L chip-rate noise streams are uncorrelated.

The complexity of DFT-based processing using the circulant approximation may be partitioned into two components: the processing of channel estimation which need not be done for every new data block and the processing of data itself which is performed for every data block. In all four embodiments, the complexity of processing data involves: 2L forward N-point DFTs; 2LN complex multiplies; and 1 inverse N-point DFT. The complexity of processing the channel estimate varies for each embodiment.

In the case of the exact MMSE solution, the complexity of computing the "MMSE filter" from the channel estimate is as follows: 2L N-point DFT's ; N 2L×2L matrix products+N 2L×2L matrix additions to compute $(\Sigma_n + H_{bT}H_{bT}^H)$; N 2L×2L matrix inverses to compute the inverse of $(\Sigma_n + H_{bT}H_{bT}^H)$; and N 2L×2L matrix products to produce the actual filter.

A major contributor to the overall complexity of this process is the matrix inverse step in which an inverse of 2L×2L matrices has to be taken. It is precisely this complexity that can be reduced by various assumptions on the uncorrelated nature of the noise, as follows:

1. If it is assumed that the noise is uncorrelated both temporally (odd/even samples) and spatially (across antennas), then $\Sigma_n$ reduces to a diagonal matrix and the problem is identical to single-sample-per-chip sampling with 2L antennas with spatially uncorrelated noise. As a result, the operation of matrix inverse simply reduces to a division since all the matrices involved are Toeplitz.
2. If it is assumed that the noise is spatially uncorrelated, then the matrix inverses involved are those of 2×2 matrices.
3. If it is assumed that a temporal uncorrelation of odd/even streams but a spatial noise correlation is retained, the matrix inverses involved are L×L.

What is claimed is:

1. A method for data estimation in a wireless communications system, the method comprising:
producing a received vector;
processing the received vector using a sliding window based approach, where a plurality of windows are processed;
for each window of the plurality of windows:
transforming a non-Toeplitz channel response matrix into a Toeplitz matrix;
transforming the Toeplitz matrix into a circulant channel response matrix; and
using the circulant channel response matrix in a discrete Fourier transform based approach for estimating a data vector corresponding to that window; and
combining the data vector estimated in each window to form a combined data vector.

2. The method of claim 1 wherein the received vector is produced by sampling at a multiple of the chip rate.

3. The method of claim 2 wherein the received vector is processed by a root-raised cosine filter prior to the sliding window based processing.

4. The method of claim 3 wherein the sliding window based processing ignores a correlation between noise associated with each multiple of the chip rate samples.

5. The method of claim 3 wherein the sliding window based approach uses a received vector and a channel response matrix arranged in a natural order, and the arranged channel response matrix is a block-Toeplitz matrix, where the natural order is the order that elements of the received vector and channel response matrix were actually received.

6. The method of claim 1 wherein a received data block processing is performed more frequently than channel filtering.

7. The method of claim 1 wherein the received vector comprises received samples from multiple receiving antennas at a multiple of the chip rate and the sliding window based approach is based on an assumption that noise is uncorrelated for each multiple of the chip rate samples and across the multiple antennas.

8. The method of claim 1 wherein the received vector comprises received samples from multiple receiving antennas at a multiple of the chip rate and the sliding window based approach is based on an assumption that noise is uncorrelated for each multiple of the chip rate samples and correlated across the multiple antennas.

9. The method of claim 1 wherein the received vector comprises received samples from multiple receiving antennas at a multiple of the chip rate and the sliding window based approach is based on an assumption that noise is correlated for each multiple of the chip rate samples and uncorrelated across the multiple antennas.

10. The method of claim 1 wherein the received vector comprises received samples from multiple receiving antennas at a multiple of the chip rate and the sliding window based approach is based on an assumption that noise is correlated for each multiple of the chip rate samples and correlated across the multiple antennas.

11. The method of claim 1 wherein a cross correlation of a noise vector is used in the sliding window processing and a pulse shaping filter is used to process received signals and a discrete Fourier transform of the pulse shaping filter is predetermined and multiplied by a measured noise variance to determine a discrete Fourier transform of the noise vector cross correlation.

12. The method of claim 1 wherein a cross correlation of a noise vector is used in the sliding window processing and a pulse shaping filter is used to process received signals and a discrete Fourier transform of an ideal pulse shape is multiplied by a measured noise variance to determine a discrete Fourier transform of the noise vector cross correlation.

13. A wireless transmit/receive unit (WTRU) comprising:
an input for receiving a received vector;
a channel equalizer for processing the received vector using a sliding window based approach, where a plurality of windows are processed; for each window of the plurality of windows: transforming a non-Toeplitz channel response matrix into a Toeplitz matrix; transforming the Toeplitz matrix into a circulant channel response matrix; and using the circulant channel response matrix in a discrete Fourier transform based approach for estimating a data vector corresponding to that window; and combining the data vector estimated in each window to form a combined data vector.

14. The WTRU of claim 13 wherein the received vector is produced by sampling at a multiple of the chip rate.

15. The WTRU of claim 14 wherein the received vector is processed by a root-raised cosine filter prior to the sliding window based processing.

16. The WTRU of claim 15 wherein the sliding window based processing ignores a correlation between noise associated with each multiple of the chip rate samples.

17. The WTRU of claim 15 wherein the sliding window based approach uses a received vector and a channel response matrix arranged in a natural order and the arranged channel response matrix is a block-Toeplitz matrix, and the natural order is an order that elements of the received vector and channel response matrix were actually received.

18. The WTRU of claim 13 wherein a received data block processing is performed more frequently than channel filtering.

19. The WTRU of claim 13 wherein the received vector comprises received samples from multiple receiving antennas at a multiple of the chip rate and the sliding window based approach is based on an assumption that noise is uncorrelated for each multiple of the chip rate samples and across the multiple antennas.

20. The WTRU of claim 13 wherein the received vector comprises received samples from multiple receiving antennas at a multiple of the chip rate and the sliding window based approach is based on an assumption that noise is uncorrelated for each multiple of the chip rate samples and correlated across the multiple antennas.

21. The WTRU of claim 13 wherein the received vector comprises received samples from multiple receiving antennas at a multiple of the chip rate and the sliding window based approach is based on an assumption that noise is correlated for each multiple of the chip rate samples and uncorrelated across the multiple antennas.

22. The WTRU of claim 13 wherein the received vector comprises received samples from multiple receiving antennas at a multiple of the chip rate and the sliding window based approach is based on an assumption that noise is correlated for each multiple of the chip rate samples and correlated across the multiple antennas.

23. The WTRU of claim 13 wherein a cross correlation of a noise vector is used in the sliding window processing and a pulse shaping filter is used to process received signals and a discrete Fourier transform of the pulse shaping filter is predetermined and multiplied by a measured noise variance to determine a discrete Fourier transform of the noise vector cross correlation.

24. The WTRU of claim 13 wherein a cross correlation of a noise vector is used in the sliding window processing and a pulse shaping filter is used to process received signals and a discrete Fourier transform of an ideal pulse shape is multiplied by a measured noise variance to determine a discrete Fourier transform of the noise vector cross correlation.

25. A wireless transmit/receive unit (WTRU) comprising:
an input for receiving a received vector;
means for processing the received vector using a sliding window based approach, where a plurality of windows are processed;
for each window of the plurality of windows:
means for transforming a non-Toeplitz channel response matrix into a Toeplitz matrix;
means for transforming the Toeplitz matrix into a circulant channel response matrix; and
means for using the circulant channel response matrix in a discrete Fourier transform based approach for estimating a data vector corresponding to that window; and
means for combining the data vector estimated in each window to form a combined data vector.

26. The WTRU of claim 25 wherein the received vector is produced by sampling at a multiple of the chip rate.

27. The WTRU of claim 26 wherein the received vector is processed by a root-raised cosine filter prior to the sliding window based processing.

28. The WTRU of claim 27 wherein the sliding window based processing ignores a correlation between noise associated with each multiple of the chip rate samples.

29. The WTRU of claim 27 wherein the sliding window based approach uses a received vector and a channel response matrix arranged in a natural order of estimated in the matrix and the arranged channel response matrix is a block-Toeplitz matrix, the natural order is an order that elements of the received vector and channel response matrix were actually received.

30. The WTRU of claim 25 wherein a received data block processing is performed more frequently than channel filtering.

31. The WTRU of claim 25 wherein the received vector comprises received samples from multiple receiving antennas at a multiple of the chip rate and the sliding window based approach is based on an assumption that noise is uncorrelated for each multiple of the chip rate samples and across the multiple antennas.

32. The WTRU of claim 25 wherein the received vector comprises received samples from multiple receiving antennas at a multiple of the chip rate and the sliding window based approach is based on an assumption that noise is uncorrelated for each multiple of the chip rate samples and correlated across the multiple antennas.

33. The WTRU of claim 25 wherein the received vector comprises received samples from multiple receiving antennas at a multiple of the chip rate and the sliding window based approach is based on an assumption that noise is correlated for each multiple of the chip rate samples and uncorrelated across the multiple antennas.

34. The WTRU of claim 25 wherein the received vector comprises received samples from multiple receiving antennas at a multiple of the chip rate and the sliding window based approach is based on an assumption that noise is correlated for each multiple of the chip rate samples and correlated across the multiple antennas.

35. The WTRU of claim 25 wherein a cross correlation of a noise vector is used in the sliding window processing and a pulse shaping filter is used to process received signals and a discrete Fourier transform of the pulse shaping filter is predetermined and multiplied by a measured noise variance to determine a discrete Fourier transform of the noise vector cross correlation.

36. The WTRU of claim 25 wherein a cross correlation of a noise vector is used in the sliding window processing and a pulse shaping filter is used to process received signals and a discrete Fourier transform of an ideal pulse shape is multiplied by a measured noise variance to determine a discrete Fourier transform of the noise vector cross correlation.

37. A base station comprising:
an input for receiving a received vector;
a channel equalizer for processing the received vector using a sliding window based approach, where a plurality of windows are processed; for each window of the plurality of windows: transforming a non-Toeplitz channel response matrix into a Toeplitz matrix; transforming the Toeplitz matrix into a circulant channel response matrix; and using the circulant channel response matrix in a discrete Fourier transform based approach for estimating a data vector corresponding to that window; and combining the data vector estimated in each window to form a combined data vector.

38. The base station of claim 37 wherein the received vector is produced by sampling at a multiple of the chip rate.

39. The base station of claim 38 wherein the received vector is processed by a root-raised cosine filter prior to the sliding window based processing.

40. The base station of claim 39 wherein the sliding window based processing ignores a correlation between noise associated with each multiple of the chip rate samples.

41. The base station of claim 39 wherein the sliding window based approach uses a received vector and a channel response matrix arranged in a natural order and the arranged channel response matrix is a block-Toeplitz matrix, and the natural order is an order that elements of the received vector and channel response matrix were actually received.

42. The base station of claim 37 wherein a received data block processing is performed more frequently than channel filtering.

43. The base station of claim 37 wherein the received vector comprises received samples from multiple receiving antennas at a multiple of the chip rate and the sliding window based approach is based on an assumption that noise is uncorrelated for each multiple of the chip rate samples and across the multiple antennas.

44. The base station of claim 37 wherein the received vector comprises received samples from multiple receiving antennas at a multiple of the chip rate and the sliding window based approach is based on an assumption that noise is uncorrelated for each multiple of the chip rate samples and correlated across the multiple antennas.

45. The base station of claim 37 wherein the received vector comprises received samples from multiple receiving antennas at a multiple of the chip rate and the sliding window based approach is based on an assumption that noise is correlated for each multiple of the chip rate samples and uncorrelated across the multiple antennas.

46. The base station of claim 37 wherein the received vector comprises received samples from multiple receiving antennas at a multiple of the chip rate and the sliding window based approach is based on an assumption that noise is correlated for each multiple of the chip rate samples and correlated across the multiple antennas.

47. The base station of claim 37 wherein a cross correlation of a noise vector is used in the sliding window processing and a pulse shaping filter is used to process received signals and a discrete Fourier transform of the pulse shaping filter is predetermined and multiplied by a measured noise variance to determine a discrete Fourier transform of the noise vector cross correlation.

48. The base station of claim 37 wherein a cross correlation of a noise vector is used in the sliding window processing and a pulse shaping filter is used to process received signals and a discrete Fourier transform of an ideal pulse shape is multiplied by a measured noise variance to determine a discrete Fourier transform of the noise vector cross correlation.

49. A base station comprising:
an input for receiving a received vector;
means for processing the received vector using a sliding window based approach, where a plurality of windows are processed;
for each window of the plurality of windows:
means for transforming a non-Toeplitz channel response matrix into a Toeplitz matrix;
means for transforming the Toeplitz matrix into a circulant channel response matrix; and
means for using the circulant channel response matrix in a discrete Fourier transform based approach for estimating a data vector corresponding to that window; and
means for combining the data vector estimated in each window to form a combined data vector.

50. The base station of claim 49 wherein the received vector is produced by sampling at a multiple of the chip rate.

51. The base station of claim 50 wherein the received vector is processed by a root-raised cosine filter prior to the sliding window based processing.

52. The base station of claim 51 wherein the sliding window based processing ignores a correlation between noise associated with each multiple of the chip rate samples.

53. The base station of claim 52 wherein the sliding window based approach uses a received vector and a channel response matrix arranged in a natural order of estimated in the matrix and the arranged channel response matrix is a block-Toeplitz matrix, the natural order is an order that elements of the received vector and channel response matrix were actually received.

54. The base station of claim 49 wherein a received data block processing is performed more frequently than channel filtering.

55. The base station of claim 49 wherein the received vector comprises received samples from multiple receiving antennas at a multiple of the chip rate and the sliding window based approach is based on an assumption that noise is uncorrelated for each multiple of the chip rate samples and across the multiple antennas.

56. The base station of claim 49 wherein the received vector comprises received samples from multiple receiving antennas at a multiple of the chip rate and the sliding window based approach is based on an assumption that noise is uncorrelated for each multiple of the chip rate samples and correlated across the multiple antennas.

57. The base station of claim 49 wherein the received vector comprises received samples from multiple receiving antennas at a multiple of the chip rate and the sliding window based approach is based on an assumption that noise is correlated for each multiple of the chip rate samples and uncorrelated across the multiple antennas.

58. The base station of claim 49 wherein the received vector comprises received samples from multiple receiving antennas at a multiple of the chip rate and the sliding window based approach is based on an assumption that noise is correlated for each multiple of the chip rate samples and correlated across the multiple antennas.

59. The base station of claim 49 wherein a cross correlation of a noise vector is used in the sliding window processing and a pulse shaping filter is used to process received signals and a discrete Fourier transform of the pulse shaping filter is predetermined and multiplied by a measured noise variance to determine a discrete Fourier transform of the noise vector cross correlation.

60. The base station of claim 49 wherein a cross correlation of a noise vector is used in the sliding window processing and a pulse shaping filter is used to process received signals and a discrete Fourier transform of an ideal pulse shape is multiplied by a measured noise variance to determine a discrete Fourier transform of the noise vector cross correlation.

61. An integrated circuit for estimating data from a received vector, the integrated circuit comprising:
a first input configured to receive a received vector;
a Fourier transform device for determining a Fourier transform of the received vector;
a second input configured to receive a channel response matrix;
a Toeplitz approximation device for determining a Toeplitz approximation for the channel response matrix;
a circulant approximation device for determining a circulant approximation for the Toeplitz approximation of the channel response matrix;
a Hermetian device for determining a Hermetian of the circulant approximation;
a cross correlation matrix determining device for determining a cross correlation matrix using the circulant approximation and the Hermetian of the circulant approximation;
a first diagonal determination device using a column of the Hermetian of the circulant approximation to produce a first diagonal matrix;
a second diagonal determination device using a column of the cross correlation matrix to produce a second diagonal matrix;
a multiplier for multiplying the first diagonal matrix, the second diagonal matrix and the Fourier transform of the received vector;
an inverse Fourier transform device for determining an inverse Fourier transform of a result of the multiplier to produce an estimate of the data vector.

62. A method for data estimation in a wireless communications system for a receiver having multiple receive antennas, the method comprising:
- for each antenna, producing a received vector and a channel response matrix;
- processing the received vector using a sliding window based approach, where a plurality of windows are processed;
- for each window of the plurality of windows:
  - transforming each non-Toeplitz channel response matrix into a Toeplitz matrix;
  - transforming each Toeplitz matrix into a circulant channel response matrix; and
  - combining the circulant channel response matrices into a combined circulant channel response matrix;
  - using the combined circulant channel response matrix and a combined received vector comprising each received vector in a discrete Fourier transform based approach for estimating a data vector corresponding to that window; and
- combining the data vector estimated in each window to form a combined data vector.

63. A method for data estimation in a wireless communications system for a receiver using multiple chip rate sampling, the method comprising:
- for each multiple of the chip rate, producing a received vector and a channel response matrix;
- processing the received vector using a sliding window based approach, where a plurality of windows are processed;
- for each window of the plurality of windows:
  - transforming each non-Toeplitz channel response matrix into a Toeplitz matrix;
  - transforming each Toeplitz matrix into a circulant channel response matrix; and
  - combining the circulant channel response matrices into a combined circulant channel response matrix;
  - using the combined circulant channel response matrix and a combined received vector comprising each received vector in a discrete Fourier transform based approach for estimating a data vector corresponding to that window; and
- combining the data vector estimated in each window to form a combined data vector.

64. The method of claim 63 wherein a receive-side root-raised cosine (RRC) filter is used and the sliding window based approach ignores a correlation of noise between samples of each multiple of the chip rate.

65. A method for data estimation is a wireless communications system for a receiver using multiple chip rate sampling and a receive-side root raised cosine filter, the method comprising:
- for each multiple of the chip rate, producing a received vector and a channel response matrix;
- processing the received vector using a sliding window based approach after receive-side root raised cosine filter processing, where a plurality of windows are processed;
- for each window of the plurality of windows:
  - providing a combined received vector having elements of the received vectors in an order that each element was actually received;
  - providing a combined channel response matrix in a block Toeplitz structure having rows or columns of the channel response matrices in an order where same rows or columns of the matrices are grouped together in the combined channel response matrix;
  - transforming the combined channel response matrix into a block circulant combined channel response matrix; and
  - using the combined block circulant channel response matrix and the combined received vector comprising each received vector in a discrete Fourier transform based approach for estimating a data vector corresponding to that window; and
- combining the data vector estimated in each window to form a combined data vector.

66. A method for data estimation in a wireless communications system for a receiver using multiple chip rate sampling and multiple receive antennas, the method comprising:
- for each combination of a multiple of the chip rate and receive antenna, producing a received vector and a channel response matrix;
- processing the received vector using a sliding window based approach, where a plurality of windows are processed;
- for each window of the plurality of windows:
  - producing a combined circulant channel response matrix using the channel response matrices; and
  - using the combined circulant channel response matrix and a combined received vector comprising each received vector in a discrete Fourier transform based approach for estimating a data vector corresponding to that window; and
- combining the data vector estimated in each window to form a combined data vector.

67. The method of claim 66 wherein the sliding window based approach uses an exact solution.

68. The method of claim 66 wherein the sliding window based approach assumes that noise between each receive antenna is uncorrelated.

69. The method of claim 66 wherein the sliding window based approach assumes that noise between multiples of the chip rate do not have a temporal correlation.

70. The method of claim 66 wherein the sliding window based approach assumes no correlation of noise between any of the combinations of the multiple of the chip rate and receive antenna exists.

* * * * *

UNITED STATES PATENT AND TRADEMARK OFFICE
CERTIFICATE OF CORRECTION

PATENT NO.         : 7,042,967 B2
APPLICATION NO. : 10/875900
DATED                  : May 9, 2006
INVENTOR(S)       : Reznik et Al.

It is certified that error appears in the above-identified patent and that said Letters Patent is hereby corrected as shown below:

ON THE TITLE PAGE

At section (56), U.S. PATENT DOCUMENTS, Page 2, right column, line 1, delete "2003/0026201 A1 2/2003 Amesen" and insert therefor --2003/0026201 A1 2/2003 Arnesen--.

At section (56), U.S. PATENT DOCUMENTS, Page 2, right column, after line 25, add a new line --2003/0152021 A1 8/2003 Wang et Al.--.

At section (56), FOREIGN PATENT DOCUMENTS, Page 3, left column, line 16, delete "WO 01/10085 A1 2/2001" and insert therefor --WO 01/10065 A1 2/2001--.

IN THE SPECIFICATIONS

At column 2, line 64, before the words "and, in", delete "system", and insert therefor --systems--.

At column 3, line 64, before "h(.)", delete "Assuming", and insert therefor --Assume--.

At column 5, line 15, after "r[k+1]", insert --has some of the elements r[k]--.

At column 7, line 21, delete Equation 26 and insert therefor $$-- \hat{\tilde{d}} = g_d \tilde{H} (g_d \tilde{H} \tilde{H}^H + \Sigma_2)^{-1} r \text{ --.}$$

At column 7, line 29, before the words "are not", delete "$H^f H_f^H$" and insert therefor --$H_f H_f^H$--.

At column 7, line 51, after the word "portion", delete "or" and insert therefor --of--.

UNITED STATES PATENT AND TRADEMARK OFFICE
CERTIFICATE OF CORRECTION

| | | |
|---|---|---|
| PATENT NO. | : 7,042,967 B2 | |
| APPLICATION NO. | : 10/875900 | |
| DATED | : May 9, 2006 | |
| INVENTOR(S) | : Reznik et Al. | |

It is certified that error appears in the above-identified patent and that said Letters Patent is hereby corrected as shown below:

At column 11, line 35, after the word "is", delete "replaces" and insert therefor --replaced--.

At column 16, line 58, after the word "frequently", delete "then" and insert therefor --than--.

At column 17, line 59, after the word "design", delete "parameters" and insert therefor --parameter--.

At column, 17, line 61, after the word "severAl", delete "chip" and insert therefor --chips--.

At column 18, line 16, delete Equation 66, and insert therefor --$W_{MXN} = W_M \otimes I_N$--.

At column 19, line 42, after the word "result", delete "are" and insert therefor --is--.

At column 19, line 45, after the word "following", delete "computation" and insert therefor --computations--.

At column 20, line 29, delete Equation 74, and insert therefor --$\sum_n = \sum_{n, 1\ ant} \otimes \sum_{sp}$--.

At column 20, line 37, before the word "denotes", insert --$\otimes$--.

IN THE CLAIMS

At claim 5, column 21, line 44, after the second use of the word "matrix", delete "where" and insert therefor --and--.

UNITED STATES PATENT AND TRADEMARK OFFICE
CERTIFICATE OF CORRECTION

PATENT NO. : 7,042,967 B2
APPLICATION NO. : 10/875900
DATED : May 9, 2006
INVENTOR(S) : Reznik et A1.

It is certified that error appears in the above-identified patent and that said Letters Patent is hereby corrected as shown below:

At claim 5, column 21, line 45, after the word "is", delete "the" and insert therefor --an--.

Signed and SeA1ed this

Twenty-sixth Day of December, 2006

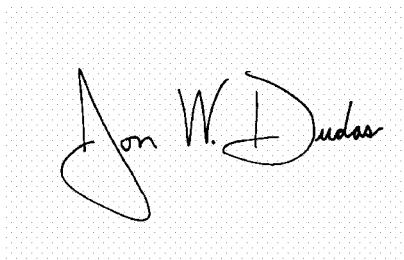

JON W. DUDAS
*Director of the United States Patent and Trademark Office*